(12) United States Patent
Jin

(10) Patent No.: US 9,984,241 B2
(45) Date of Patent: May 29, 2018

(54) METHOD, APPARATUS, AND SYSTEM FOR DATA PROTECTION

(71) Applicant: Huawei Technologies Co., Ltd., Shenzhen (CN)

(72) Inventor: Wei Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 14/835,822

(22) Filed: Aug. 26, 2015

(65) Prior Publication Data

US 2015/0363600 A1  Dec. 17, 2015

Related U.S. Application Data

(63) Continuation of application No. PCT/CN2014/070469, filed on Jan. 10, 2014.

(30) Foreign Application Priority Data

Mar. 12, 2013 (CN) .......................... 2013 1 0077689

(51) Int. Cl.
*H04L 29/06* (2006.01)
*G06F 21/60* (2013.01)
(Continued)

(52) U.S. Cl.
CPC ........ *G06F 21/606* (2013.01); *G06F 21/6245* (2013.01); *H04L 51/12* (2013.01);
(Continued)

(58) Field of Classification Search
CPC ... G06F 21/606; G06F 21/6245; H04L 51/12; H04L 63/0281; H04L 63/1408; H04L 67/2819
See application file for complete search history.

(56) References Cited

U.S. PATENT DOCUMENTS 6,253,202 B1 * 6/2001 Gilmour ............. G06F 17/3061
6,330,546 B1 * 12/2001 Gopinathan ........... G06Q 20/00
705/35

(Continued)

FOREIGN PATENT DOCUMENTS

CN  1722710 A  1/2006
CN  101401466 A  4/2009
(Continued)

OTHER PUBLICATIONS

Foreign Communication From a Counterpart Application, European Application No. 14782100.3, Extended European Search Report dated Feb. 22, 2016, 7 pages.
(Continued)

*Primary Examiner* — Sharon Lynch
(74) *Attorney, Agent, or Firm* — Conely Rose, P.C.

(57) ABSTRACT

A method, an apparatus, and a system for data protection. A specific solution is: a proxy server receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data. The present invention is used during a protection process of outgoing data.

13 Claims, 12 Drawing Sheets

(51) Int. Cl.
*H04L 12/58* (2006.01)
*H04L 29/08* (2006.01)
*G06F 21/62* (2013.01)

(52) U.S. Cl.
CPC ...... *H04L 63/0281* (2013.01); *H04L 63/1408* (2013.01); *H04L 67/2819* (2013.01)

(56) References Cited

U.S. PATENT DOCUMENTS

| | | | | |
|---|---|---|---|---|
| 6,658,393 | B1* | 12/2003 | Basch | G06Q 20/341 705/35 |
| 7,209,895 | B2* | 4/2007 | Kundtz | G06Q 30/02 705/14.27 |
| 8,019,678 | B2* | 9/2011 | Wright | G06Q 20/04 705/35 |
| 8,020,763 | B1* | 9/2011 | Kowalchyk | G06Q 20/102 235/380 |
| 8,060,596 | B1 | 11/2011 | Wootton et al. | |
| 8,407,139 | B1* | 3/2013 | Palmer | G06Q 40/025 235/380 |
| 8,499,355 | B1* | 7/2013 | Goncharov | G06F 21/44 726/25 |
| 8,799,150 | B2* | 8/2014 | Annappindi | G06Q 40/02 705/322 |
| 2005/0027980 | A1 | 2/2005 | Peled et al. | |
| 2005/0261919 | A1* | 11/2005 | Kundtz | G06Q 30/02 705/14.4 |
| 2005/0273442 | A1* | 12/2005 | Bennett | G06Q 20/3674 705/67 |
| 2006/0226216 | A1* | 10/2006 | Keithley | G06Q 20/40 235/379 |
| 2006/0282660 | A1* | 12/2006 | Varghese | G06Q 20/341 713/155 |
| 2007/0106582 | A1* | 5/2007 | Baker | G06Q 10/067 705/35 |
| 2007/0195779 | A1 | 8/2007 | Judge et al. | |
| 2008/0086759 | A1* | 4/2008 | Colson | G06F 21/34 726/2 |
| 2008/0140576 | A1* | 6/2008 | Lewis | G06Q 10/0635 705/67 |
| 2009/0241197 | A1 | 9/2009 | Troyansky | |
| 2011/0078073 | A1* | 3/2011 | Annappindi | G06Q 40/02 705/38 |
| 2011/0083159 | A1 | 4/2011 | Brown et al. | |
| 2011/0196791 | A1* | 8/2011 | Dominguez | G06Q 20/40 705/44 |
| 2012/0060207 | A1* | 3/2012 | Mardikar | G06F 21/33 726/4 |
| 2012/0191596 | A1* | 7/2012 | Kremen | G06Q 40/02 705/38 |
| 2012/0266227 | A1* | 10/2012 | Colson | G06F 21/34 726/7 |
| 2012/0291087 | A1 | 11/2012 | Agarawal | |
| 2013/0139238 | A1* | 5/2013 | Ryan | G06F 21/36 726/7 |
| 2013/0227712 | A1* | 8/2013 | Salem | G06F 21/6218 726/30 |
| 2013/0276125 | A1* | 10/2013 | Bailey | H04L 63/1433 726/25 |
| 2014/0196103 | A1* | 7/2014 | Chari | H04L 63/20 726/1 |
| 2014/0304157 | A1* | 10/2014 | Bachenheimer | G06Q 20/4016 705/44 |
| 2015/0026039 | A1* | 1/2015 | Annappindi | G06Q 40/02 705/38 |
| 2017/0124645 | A1* | 5/2017 | Kortina | G06Q 40/025 |

FOREIGN PATENT DOCUMENTS

| | | |
|---|---|---|
| CN | 101978669 A | 2/2011 |
| CN | 103209174 A | 7/2013 |

OTHER PUBLICATIONS

Partial English Translation and Abstract of Chinese Patent Application No. CN103209174, Jul. 14, 2015, 3 pages.
Foreign Communication From a Counterpart Application, Chinese Application No. 201310077689.3, Chinese Office Action dated Jul. 3, 2015, 9 pages.
Foreign Communication From a Counterpart Application, PCT Application No. PCT/CN2014/070469, English Translation of International Search Report dated Apr. 23, 2014, 2 pages.
Foreign Communication From a Counterpart Application, PCT Application No. PCT/CN2014/070469, English Translation of Written Opinion dated Apr. 23, 2014, 5 pages.

* cited by examiner

METHOD, APPARATUS, AND SYSTEM FOR DATA PROTECTION

CROSS-REFERENCE TO RELATED APPLICATIONS

This application is a continuation of International Application No. PCT/CN2014/070469, filed on Jan. 10, 2014, which claims priority to Chinese Patent Application No. 201310077689.3, filed on Mar. 12, 2013, both of which are hereby incorporated by reference in their entireties.

TECHNICAL FIELD

The present invention relates to the field of communications technologies, and in particular, to a method, an apparatus, and a system for data protection.

BACKGROUND

With development of informatization, information security is gradually becoming core content of security management and risk control of an enterprise. To prevent an employee from disclosing information when externally sending data, many enterprises deploy a data loss prevention (DLP) server in their internal networks to protect security of data of the enterprises.

In an existing DLP implementation solution, a web proxy server or a mail transfer agent (MTA) server may be used to transmit outgoing data (web data or a mail) from a user terminal to a DLP server. The DLP server inspects security of data in an outgoing data flow using a keyword matching algorithm, a metadata matching algorithm, a regular expression matching algorithm, a multi-pattern matching algorithm, a fingerprint matching algorithm, or the like, sends data that passes the security inspection to a destination address, and intercepts data that fails the security inspection or selectively sends the data to the destination address.

In the prior art, during security inspection, a DLP server executes a same inspection process for outgoing data of all users within a monitoring scope of a system, which causes a long security inspection delay of outgoing data, thereby affecting efficiency of external sending of data and user experience.

SUMMARY

Embodiments of the present invention provide a method, an apparatus, and a system for data protection, which can reduce a security inspection delay of outgoing data, thereby further improving efficiency of external sending of data and user experience.

To achieve the foregoing objectives, the embodiments of the present invention adopt the following technical solutions.

According to a first aspect, a data protection method is provided, including receiving outgoing data from a user terminal, where the outgoing data carries an identifier of a user; acquiring a user grade and a credit value of the user from a credit server according to the identifier, where the credit value is a violation percentage of historical outgoing data of the user; sending the outgoing data, the user grade, and the credit value to a data loss prevention DLP server so that the DLP server inspects security of the outgoing data according to the user grade and the credit value and further generates a message including an inspection result, where the inspection result includes Pass the security inspection and Fail the security inspection; and receiving, from the DLP server, the message including the inspection result and using a policy corresponding to the inspection result to process the outgoing data according to the inspection result.

With reference to the first aspect, in a first possible implementation manner of the first aspect, acquiring a user grade and a credit value of the user from a credit server according to the identifier includes sending the identifier to the credit server so that the credit server queries the user grade and the credit value of the user according to the identifier and receiving the user grade and the credit value from the credit server.

With reference to the first aspect or the first possible implementation manner of the first aspect, in a second possible implementation manner of the first aspect, the outgoing data from the user terminal is outgoing data that is of the user terminal and passes identity authentication.

With reference to the first aspect or the first possible implementation manner of the first aspect or second possible implementation manner of the first aspect, in a third possible implementation manner of the first aspect, the user grade of the user includes an exempted from inspection grade, an inspection grade, and an outgoing permission prohibition grade, where the inspection grade at least includes a simple inspection grade and a strict inspection grade; and the violation percentage is calculated by the credit server according to the number of times that the historical outgoing data of the user passes the security inspection and the number of times that the historical outgoing data of the user fails the security inspection, where the numbers are pre-stored in the credit server.

With reference to the first aspect or the first, second, or third possible implementation manner of the first aspect, in a fourth possible implementation manner of the first aspect, using a policy corresponding to the inspection result to process the outgoing data according to the inspection result includes, if the inspection result indicates that the outgoing data passes the security inspection, sending the outgoing data to a destination address of the outgoing data; and if the inspection result indicates that the outgoing data fails the security inspection, intercepting the outgoing data.

With reference to the first aspect or any one of the foregoing possible implementation manners of the first aspect, in a fifth possible implementation manner of the first aspect, after receiving, from the DLP server, the message including the inspection result and using a policy corresponding to the inspection result to process the outgoing data according to the inspection result, the method further includes sending the message including the inspection result to the credit server so that the credit server updates the user grade and the credit value according to the identifier and the inspection result; and receiving, from the user terminal, the outgoing data that is of the user terminal and passes identity authentication.

With reference to the first aspect or any one of the foregoing possible implementation manners of the first aspect, in a sixth possible implementation manner of the first aspect, if the outgoing data is Web data, sending the outgoing data, the user grade, and the credit value to a DLP server includes sending the outgoing data, the user grade, and the credit value to the DLP server using the Internet Content Adaptation Protocol (ICAP), where the user grade and the credit value are carried in an extended ICAP header field.

According to a second aspect, a data protection method is further provided, including receiving outgoing data, a user grade, and a credit value sent by a proxy server, where the outgoing data carries an identifier of a user, the user grade and the credit value are acquired by the proxy server from a credit server according to the identifier, and the credit value is a violation percentage of historical outgoing data of the user; inspecting security of the outgoing data according to the user grade and the credit value and generating a message including an inspection result, where the inspection result includes Pass the security inspection and Fail the security inspection; and sending the message including the inspection result to the proxy server so that the proxy server uses a policy corresponding to the inspection result to process the outgoing data according to the inspection result.

With reference to the second aspect, in a first possible implementation manner of the second aspect, the user grade of the user includes an exempted from inspection grade, an inspection grade, and an outgoing permission prohibition grade, where the inspection grade at least includes a simple inspection grade and a strict inspection grade; and the violation percentage is calculated by the credit server according to the number of times that historical outgoing data of the user passes the security inspection, and the number of times that historical outgoing data of the user fails the security inspection, where the numbers are prestored in the credit server.

With reference to the second aspect or the first possible implementation manner of the second aspect, in a second possible implementation manner of the second aspect, the inspecting security of the outgoing data according to the user grade and the credit value and generating a message including an inspection result includes, if the user grade is the exempted from inspection grade, directly generating the message indicating that the security inspection passes; if the user grade is the outgoing permission prohibition grade, directly generating the message indicating that the security inspection fails; and if the user grade is the inspection grade, inspecting the security of the outgoing data according to the inspection grade and the credit value and generating the message including the inspection result.

With reference to the second aspect or the first or second possible implementation manner of the second aspect, in a third possible implementation manner of the second aspect, inspecting the security of the outgoing data according to the inspection grade and the credit value and generating the message including the inspection result includes selecting a corresponding inspection algorithm according to a specific grade of the inspection grade; restoring the outgoing data according to a preset restoration policy; using the selected inspection algorithm to inspect the restored outgoing data with reference to the credit value; and acquiring an inspection result of the restored outgoing data and generating the message including the inspection result.

With reference to the second aspect or the first, second, or third possible implementation manner of the second aspect, in a fourth possible implementation manner of the second aspect, after the sending of the message including the inspection result to the proxy server, the method further includes sending the message including the inspection result to the credit server so that the credit server updates the user grade and the credit value according to the identifier and the inspection result.

According to a third aspect, a data protection method is further provided, including receiving an identifier of a user from a proxy server; querying a user grade and a credit value of the user according to the identifier, where the credit value is a violation percentage of historical outgoing data of the user; and sending the user grade and the credit value to the proxy server.

With reference to the third aspect, in a first possible implementation manner of the third aspect, the user grade of the user includes an exempted from inspection grade, an inspection grade, and an outgoing permission prohibition grade, where the inspection grade at least includes a simple inspection grade and a strict inspection grade; and the violation percentage is calculated by a credit server according to the number of times that the historical outgoing data of the user passes security inspection, and the number of times that the historical outgoing data of the user fails the security inspection, where the numbers are prestored in the credit server.

With reference to the third aspect or the first possible implementation manner of the third aspect, in a second possible implementation manner of the third aspect, after the sending of the user grade and the credit value to the proxy server, the method further includes receiving, from a DLP server, a message including an inspection result or receiving, from the proxy server, a message including an inspection result; and updating the user grade and the credit value according to the inspection result.

With reference to the third aspect or the first or second possible implementation manner of the third aspect, in a third possible implementation manner of the third aspect, updating the user grade and the credit value according to the inspection result includes updating, according to the inspection result, the prestored number of times that the historical outgoing data of the user passes the security inspection or the prestored number of times that the historical outgoing data of the user fails the security inspection; calculating the credit value according to the updated number of times that the historical outgoing data passes the security inspection and the updated number of times that the historical outgoing data fails the security inspection; determining whether the credit value exceeds a preset threshold; and lowering the user grade if the credit value exceeds the preset threshold.

According to a fourth aspect, a proxy server is further provided, including a receiving unit configured to receive outgoing data from a user terminal, where the outgoing data carries an identifier of a user; an acquiring unit configured to acquire a user grade and a credit value of the user from a credit server according to the identifier received by the receiving unit, where the credit value is a violation percentage of historical outgoing data of the user; a sending unit configured to send the outgoing data received by the receiving unit as well as the user grade and the credit value that are acquired by the acquiring unit to a data loss prevention DLP server so that the DLP server inspects security of the outgoing data according to the user grade and the credit value, and further generates a message including an inspection result, where the inspection result includes Pass the security inspection and Fail the security inspection, and where the receiving unit is further configured to receive, from the DLP server, the message including the inspection result; and a processing unit configured to use a policy corresponding to the inspection result to process the outgoing data according to the inspection result received by the receiving unit.

With reference to the fourth aspect, in a first possible implementation manner of the fourth aspect, the acquiring unit includes a sending subunit configured to send the identifier to the credit server so that the credit server queries the user grade and the credit value of the user according to the identifier; and a receiving subunit configured to receive the user grade and the credit value from the credit server.

With reference to the fourth aspect or the first possible implementation manner of the fourth aspect, in a second possible implementation manner of the fourth aspect, the outgoing data from the user terminal is outgoing data that is of the user terminal and passes identity authentication.

With reference to the fourth aspect or the first possible implementation manner of the fourth aspect or second possible implementation manner of the fourth aspect, in a third possible implementation manner of the fourth aspect, the user grade of the user includes an exempted from inspection grade, an inspection grade, and an outgoing permission prohibition grade, where the inspection grade at least includes a simple inspection grade and a strict inspection grade; and the violation percentage is calculated by the credit server according to the number of times that the historical outgoing data of the user passes the security inspection, and the number of times that the historical outgoing data of the user fails the security inspection, where the numbers are prestored in the credit server.

With reference to the fourth aspect or the first, second, or third possible implementation manner of the fourth aspect, in a fourth possible implementation manner of the fourth aspect, the processing unit includes: a second sending subunit configured to, if the inspection result received by the receiving unit indicates that the outgoing data passes the security inspection, send the outgoing data to a destination address of the outgoing data; and an intercepting subunit configured to, if the inspection result received by the receiving unit indicates that the outgoing data fails the security inspection, intercept the outgoing data.

With reference to the fourth aspect or any one of the foregoing possible implementation manners of the fourth aspect, in a fifth possible implementation manner of the fourth aspect, the sending unit is further configured to, after the processing unit executes using a policy corresponding to the inspection result to process the outgoing data according to the inspection result, send the message including the inspection result to the credit server so that the credit server updates the user grade and the credit value according to the identifier and the inspection result.

With reference to the fourth aspect or any one of the foregoing possible implementation manners of the fourth aspect, in a sixth possible implementation manner of the fourth aspect, the sending unit is further configured to, if the outgoing data is Web data, send the outgoing data, the user grade, and the credit value to the DLP server using ICAP, where the user grade and the credit value are carried in an extended ICAP header field.

According to a fifth aspect, a DLP server is further provided, including: a receiving unit configured to receive outgoing data, a user grade, and a credit value sent by a proxy server, where the outgoing data carries an identifier of a user, the user grade and the credit value are acquired by the proxy server from a credit server according to the identifier, and the credit value is a violation percentage of the historical outgoing data of the user; an inspecting unit configured to inspect security of the outgoing data according to the user grade and the credit value that are received by the receiving unit and generate a message including an inspection result, where the inspection result includes Pass the security inspection and Fail the security inspection; and a sending unit configured to send, to the proxy server, the message including the inspection result, which is generated by the inspecting unit so that the proxy server uses a policy corresponding to the inspection result to process the outgoing data according to the inspection result.

With reference to the fifth aspect, in a first possible implementation manner of the fifth aspect, the user grade of the user includes an exempted from inspection grade, an inspection grade, and an outgoing permission prohibition grade, where the inspection grade at least includes a simple inspection grade and a strict inspection grade; and the violation percentage is calculated by the credit server according to the number of times that historical outgoing data of the user passes the security inspection, and the number of times that historical outgoing data of the user fails the security inspection, where the numbers are prestored in the credit server.

With reference to the fifth aspect or the first possible implementation manner of the fifth aspect, in a second possible implementation manner of the fifth aspect, the inspecting unit includes a first inspecting subunit configured to, if the user grade is the exempted from inspection grade, directly generate the message indicating that the security inspection passes; and a second inspecting subunit configured to, if the user grade is the outgoing permission prohibition grade, directly generate the message indicating that the security inspection fails; and a third inspecting subunit configured to, if the user grade is the inspection grade, inspect the security of the outgoing data according to the inspection grade and the credit value, and generate the message including the inspection result.

With reference to the fifth aspect or the first or second possible implementation manner of the fifth aspect, in a third possible implementation manner of the fifth aspect, the third inspecting subunit includes a selecting module configured to select a corresponding inspection algorithm according to a specific grade of the inspection grade; a restoring module configured to restore the outgoing data according to a preset restoration policy; an inspecting module configured to use the selected inspection algorithm to inspect the restored outgoing data with reference to the credit value; and a generating module configured to acquire an inspection result and generate the message including the inspection result.

With reference to the fifth aspect or the first, second, or third possible implementation manner of the fifth aspect, in a fourth possible implementation manner of the fifth aspect, the sending unit is configured to, after the message including the inspection result is sent to the proxy server, send the message including the inspection result to the credit server so that the credit server updates the user grade and the credit value according to the identifier and the inspection result.

According to a sixth aspect, a credit server is further provided, including a first receiving unit configured to receive an identifier of a user from a proxy server; a querying unit configured to query a user grade and a credit value of the user according to the identifier received by the first receiving unit, where the credit value is a violation percentage of historical outgoing data of the user; and a sending unit configured to send, to the proxy server, the user grade and the credit value that are queried by the querying unit.

With reference to the sixth aspect, in a first possible implementation manner of the sixth aspect, the user grade of the user includes an exempted from inspection grade, an inspection grade, and an outgoing permission prohibition grade, where the inspection grade at least includes a simple inspection grade and a strict inspection grade; and the violation percentage is calculated by the credit server according to the number of times that the historical outgoing data of the user passes security inspection, and the number of times that the historical outgoing data of the user fails the security inspection, where the numbers are prestored in the credit server.

With reference to the sixth aspect or the first possible implementation manner of the sixth aspect, in a second possible implementation manner of the sixth aspect, the credit server further includes a second receiving unit configured to, after the sending unit sends the user grade and the credit value to the proxy server, receive, from a DLP server, a message including an inspection result or receive, from the proxy server, a message including an inspection result; and an updating unit configured to update the user grade and the credit value according to the inspection result received by the second receiving unit.

With reference to the sixth aspect or the first or second possible implementation manner of the sixth aspect, in a third possible implementation manner of the sixth aspect, the updating unit includes an updating subunit configured to update, according to the inspection result, the prestored number of times that the historical outgoing data of the user passes the security inspection or the prestored number of times that the historical outgoing data of the user fails the security inspection; a calculating subunit configured to calculate the credit value according to the number of times that the historical outgoing data passes the security inspection, and the number of times that the historical outgoing data fails the security inspection, where the numbers are updated by the updating subunit; a determining subunit configured to determine whether the credit value exceeds a preset threshold; and a degrading subunit configured to, if the determining subunit determines that the credit value exceeds the preset threshold, lower the user grade.

According to a seventh aspect of the embodiments of the present invention, a data protection system is further provided, including the proxy server according to the foregoing fourth aspect or any one of the possible implementation manners of the fourth aspect, the DLP server according to the foregoing fifth aspect or any one of the possible implementation manners of the fifth aspect, and the credit server according to the foregoing sixth aspect or any one of the possible implementation manners of the sixth aspect.

Based on the method, the apparatus, and the system for data protection according to the embodiments of the present invention, a proxy server receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
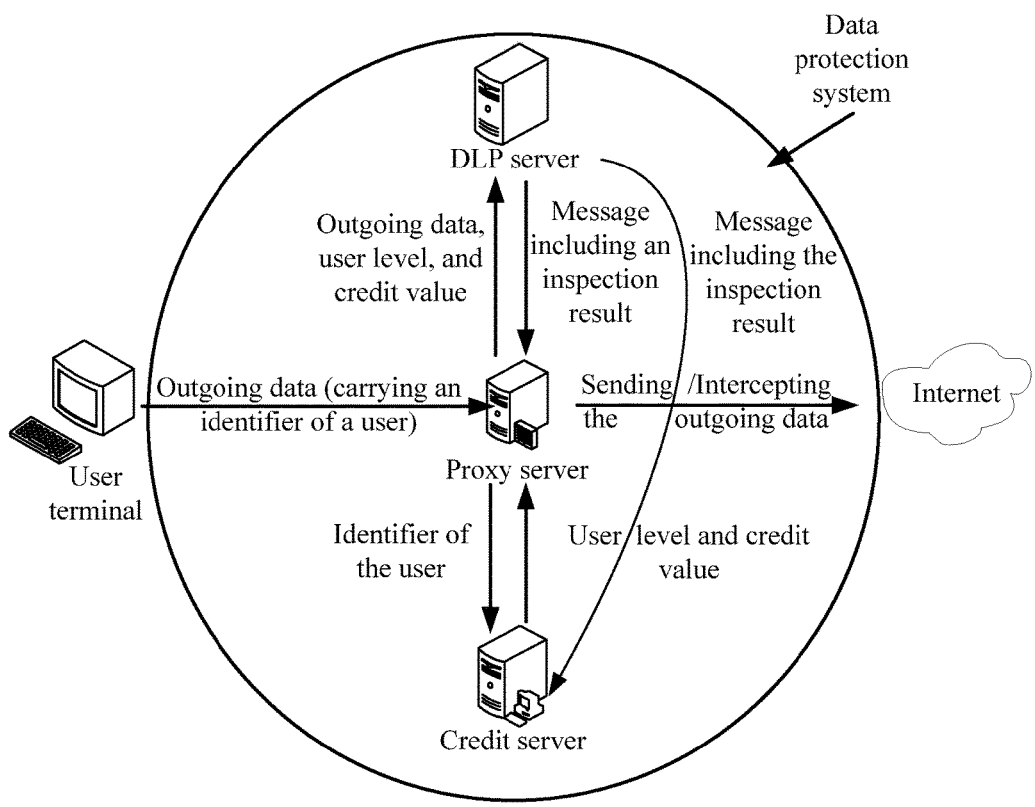
FIG. 1 is a schematic composition diagram of a data protection system according to Embodiment 11 of the present invention.

It should be noted that, as shown in FIG. 1, a data protection system provided by an embodiment of the present invention may include a proxy server, a credit server, and a DLP server. The proxy server may receive outgoing data from a user terminal; acquire a user grade and a credit value from the credit server according to an identifier of a user, which is carried in the outgoing data; send the user grade and the credit value to the DLP server; receive an inspection result from the DLP server; and send or intercept the outgoing data according to the inspection result. The credit server may query and update the user grade and the credit value according to the identifier. The DLP server may inspect security of the outgoing data according to the user grade and the credit value. The foregoing user terminal may be a user terminal in an internal local area network of an enterprise. The proxy server is deployed at a border between a local area network and an external network. The credit server is configured to manage a user grade and a credit value of an internal user of the enterprise.

Embodiment 1

Figure 2:
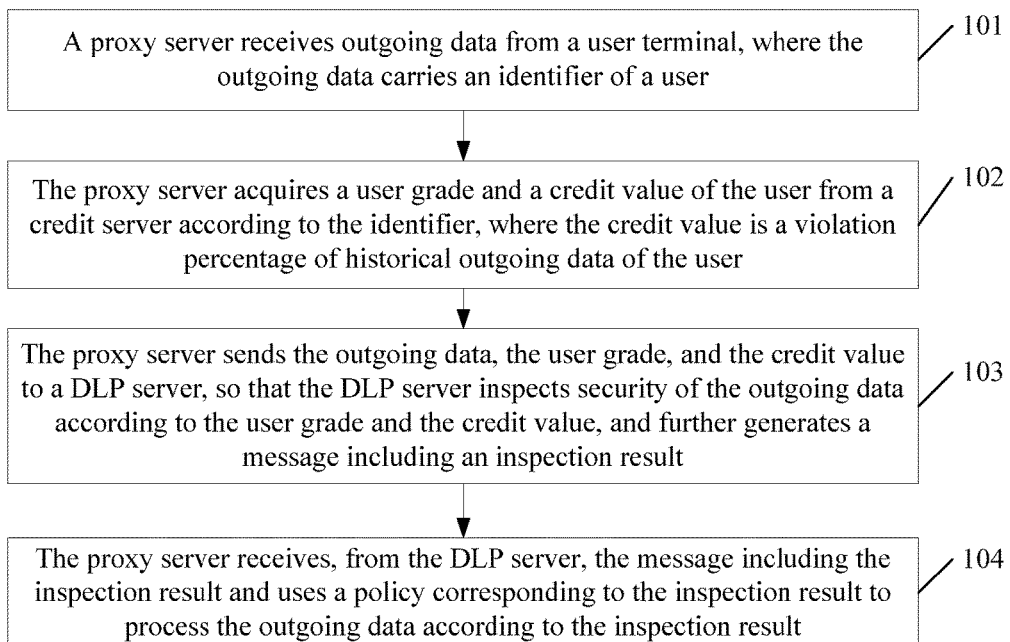
FIG. 2 is a flowchart of a data protection method according to Embodiment 1 of the present invention.

To clearly describe a working process of a proxy server in a data protection system provided by an embodiment of the present invention, a data protection method provided by this embodiment of the present invention is applied to a proxy server. As shown in FIG. 2, the data protection method includes the following steps.

101: The proxy server receives outgoing data from a user terminal, where the outgoing data carries an identifier of a user.

The proxy server may include an application proxy (Web Proxy) server, an MTA server, and the like. The outgoing data may include Web data (for example, a Hypertext Transfer Protocol (HTTP) data flow), mail data, and the like.

For example, when the outgoing data is Web data, the proxy server is a Web Proxy server. When the outgoing data is mail data, the proxy server is an MTA server.

102: The proxy server acquires a user grade and a credit value of the user from a credit server according to the identifier, where the credit value is a violation percentage of historical outgoing data of the user.

The identifier of the user is used to differentiate user identifier information of different users, and may include forms such as a user name+a user identifier (ID) and a user name+a medium/media access control (MAC) address. The MAC address is also known as a hardware address or a physical address. During a physical transmission process at a bottom layer of a network, the MAC address may be used to identify a host. Like the identity card number, the MAC address is globally unique.

It should be noted that the identifier of the user includes but is not limited to the forms listed in this embodiment of the present invention. This embodiment of the present invention poses no limitation on specific constitution of the identifier of the user, and other constitutions of the identifier are not described in this embodiment again.

The method used by the proxy server to acquire a user grade and a credit value of the user from a credit server according to the identifier may include sending, by the proxy server, the identifier to the credit server so that the credit server queries the user grade and the credit value of the user according to the identifier; and receiving, by the proxy server, the user grade and the credit value from the credit server.

103: The proxy server sends the outgoing data, the user grade, and the credit value to a DLP server so that the DLP server inspects security of the outgoing data according to the user grade and the credit value, and further generates a message including an inspection result, where the inspection result includes Pass the security inspection and Fail the security inspection.

104: The proxy server receives, from the DLP server, the message including the inspection result and uses a policy corresponding to the inspection result to process the outgoing data according to the inspection result.

The proxy server using a preset policy to process the outgoing data according to the inspection result includes, if the inspection result indicates that the outgoing data passes the security inspection, sending, by the proxy server, the outgoing data to a destination address of the outgoing data; if the inspection result indicates that the outgoing data fails the security inspection, intercepting, by the proxy server, the outgoing data.

Further optionally, to ensure that the user grade and the user credit value that are stored in the credit server are obtained in real time, after the proxy server receives, from the DLP server, the message including the inspection result, the method provided by this embodiment of the present invention may further include sending, by the proxy server, the message including the inspection result to the credit server so that the credit server updates the user grade and the credit value according to the identifier and the inspection result.

Based on the data protection method provided by this embodiment of the present invention, a proxy server receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 2

Figure 3:
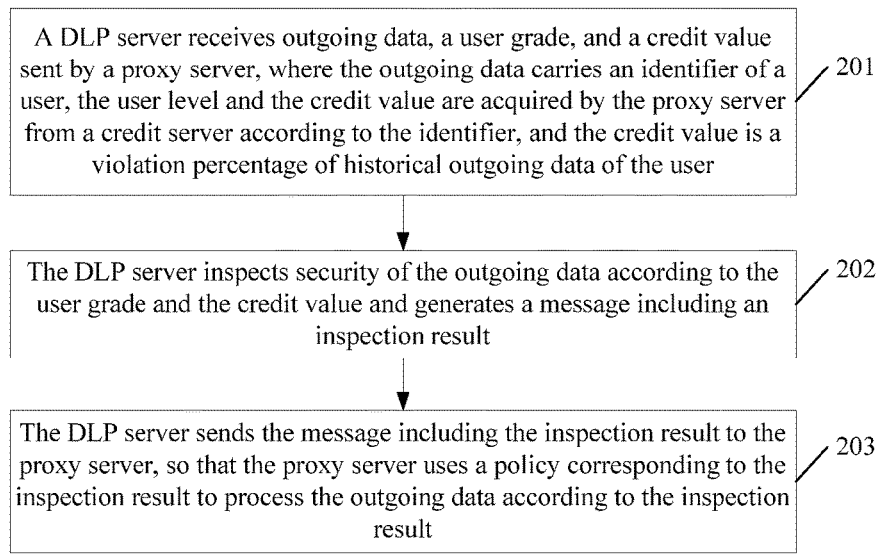
FIG. 3 is a flowchart of a data protection method according to Embodiment 2 of the present invention.

To clearly describe a working process of a DLP server in a data protection system provided by an embodiment of the present invention, a data protection method provided by this embodiment of the present invention is applied to a DLP server. As shown in FIG. 3, the data protection method includes the following steps.

201: The DLP server receives outgoing data, a user grade, and a credit value sent by a proxy server, where the outgoing data carries an identifier of a user, the user grade and the credit value are acquired by the proxy server from a credit server according to the identifier, and the credit value is a violation percentage of historical outgoing data of the user.

As a computer security term, DLP means that a system identifies, monitors, and protects data in all states. The data may be classified into data in use (for example, endpoint data), data in motion (for example, network data), and data at rest (for example, stored data). DLP mainly detects and prevents use and transmission of unauthorized confidential information by means of in-depth content detection, context security event analysis (for example, an attribute of a start point, a data object, an intermediate node, time, and a receiver/a destination address), and the like.

The DLP server in this embodiment of the present invention is an electronic device that is installed on an exit point of a network and may analyze data passing through the network to detect whether the data passing through the network includes sensitive data violating an information security policy.

202: The DLP server inspects security of the outgoing data according to the user grade and the credit value and generates a message including an inspection result.

The user grade of the user includes an exempted from inspection grade, an inspection grade, and an outgoing permission prohibition grade, where the inspection grade at least includes a simple inspection grade and a strict inspection grade. The user credit value of the user is the violation percentage of the user, which is calculated by the credit server according to the number of times that historical outgoing data of the user passes the inspection, and the number of times that historical outgoing data of the user fails the inspection, where the numbers are prestored in the credit server.

The DLP server inspecting the outgoing data according to the user grade and the credit value and generating a message including an inspection result includes, if the user grade is the exempted from inspection grade, directly generating, by the DLP server, the message indicating that the security inspection passes; if the user grade is the outgoing permission prohibition grade, directly generating, by the DLP server, the message indicating that the security inspection fails; if the user grade is the inspection grade, inspecting, by the DLP server, the outgoing data according to the inspection grade and the user credit value, and generating the message including the inspection result.

When the user grade is the inspection grade, the DLP server needs to inspect the outgoing data according to a specific grade of the inspection grade, for example, the simple inspection grade or the strict inspection grade, and generates the message including the corresponding inspection result. The DLP server inspecting the outgoing data according to the inspection grade and the user credit value and generating the message including the inspection result includes selecting, by the DLP server, a corresponding inspection algorithm according to the specific grade of the inspection grade; restoring the outgoing data according to a preset restoration policy; using the selected inspection algorithm to inspect the restored outgoing data with reference to the user credit value; and acquiring an inspection result and generating the message including the inspection result.

203: The DLP server sends the message including the inspection result to the proxy server so that the proxy server uses a policy corresponding to the inspection result to process the outgoing data according to the inspection result.

The inspection result may include the outgoing data passing the security inspection or the outgoing data failing the security inspection.

Further optionally, to ensure real-time performance of the user grade and the user credit value that are stored in the credit server, after the DLP server sends the message including the inspection result to the proxy server, the method provided by this embodiment may further include sending, by the DLP server, the message including the inspection result to the credit server so that the credit server updates the user grade and the credit value according to the identifier and the inspection result.

Based on the data protection method provided by this embodiment of the present invention, a DLP server receives outgoing data, a user grade, and a credit value from a proxy server, where the outgoing data carries an identifier of a user, the user grade and the credit value are acquired by the proxy server from a credit server according to the identifier, and the credit value is a violation percentage of historical outgoing data of the user; then inspects security of the outgoing data according to the user grade and the credit value, and generates a message including an inspection result; and finally sends the message including the inspection result to the proxy server so that the proxy server uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which simplifies a security inspection method for a part of users because there is no need to execute data restoration or run an inspection algorithm for this part of users, thereby reducing a security inspection delay of the outgoing data and further improving efficiency of external sending of data and user experience. In addition, executing data restoration and running an inspection algorithm need to consume many processing resources of a DLP server. In this embodiment of the present invention, there is no need to execute data restoration and run an inspection algorithm for a part of users, thereby lightening processing load of a DLP server.

Embodiment 3

Figure 4:
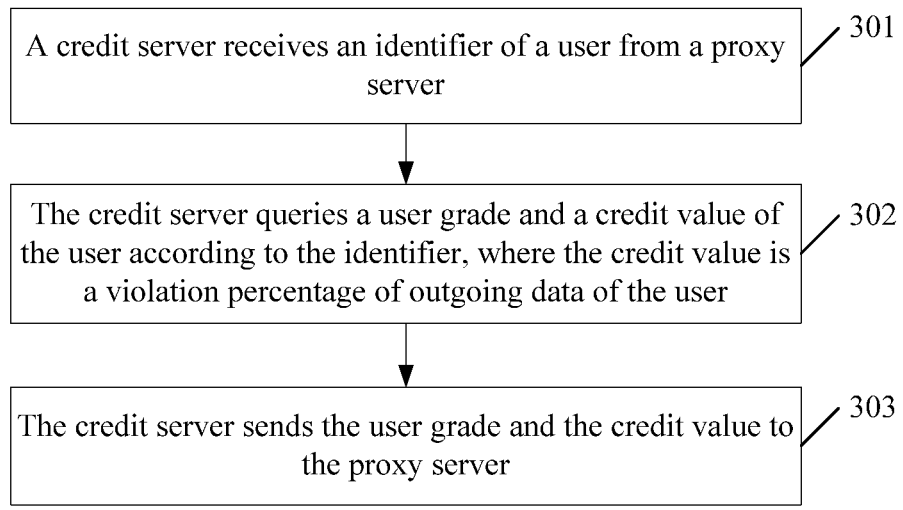
FIG. 4 is a flowchart of a data protection method according to Embodiment 3 of the present invention.

To clearly describe a working process of a credit server in a data protection system provided by an embodiment of the present invention, a data protection method provided by this embodiment of the present invention is applied to a credit server. As shown in FIG. 4, the data protection method includes the following steps.

301: The credit server receives an identifier of a user from a proxy server.

The credit server is a database-based server. The credit server may store a user grade and a credit value of each user within a monitoring scope of a system.

The credit server may use a mature relational database to store data, or may use a Lightweight Directory Access Protocol (LDAP) database to store data. The LDAP is an information service that may provide a directory service. The directory service is a special database system, where the database system performs optimization dedicated to reading, browse, and search operations. A directory includes descriptive attribute-based information and supports a refined and complex filtering capability. The directory may store all types of information such as personal information, a web link, and a Joint Photographic Experts Group (JPEG) image.

302: The credit server queries a user grade and a credit value of the user according to the identifier, where the credit value is a violation percentage of outgoing data of the user.

It should be noted that the credit server and the proxy server share one set of user identifiers, and the credit server and a DLP server share one set of user grade and credit value information.

Exemplarily, the user grade of the user includes an exempted from inspection grade, an inspection grade, and an outgoing permission prohibition grade, where the inspection grade at least includes a simple inspection grade and a strict inspection grade. The credit server may further classify a grade of a user in the system. For example, the inspection grade may include the simple inspection grade, a lightweight inspection grade, a heavyweight inspection grade, the strict inspection grade, and the like.

Exemplarily, the user credit value of the user is the violation percentage of the user, which is calculated by the credit server according to the number of times that historical outgoing data of the user passes inspection, and the number of times that historical outgoing data of the user fails the inspection, where the numbers are prestored in the credit server. For example, if the number of times that outgoing data of a user A passes the inspection is x and the number of times that the outgoing data of the user A fails the inspection is y, a credit value of the user A, that is, a violation percentage of the user A may be $y/(x+y)*100\%$.

It should be noted that the user grade in the present invention includes but is not limited to the user grades listed in this embodiment and the method used by the credit server to acquire the user credit value in the present invention includes but is not limited to the method provided in this embodiment. Other user grades and other methods used by the credit server to acquire a user credit value are not described in this embodiment again.

303: The credit server sends the user grade and the credit value to the proxy server.

Further optionally, to ensure real-time performance of the user grade and the user credit value that are stored in the credit server, the method in this embodiment may further include, after the credit server sends the user grade and the credit value to the proxy server, receiving, from the DLP server by the credit server, a message including an inspection result; or receiving, from the proxy server by the credit server, a message including an inspection result; and updating, by the credit server, the user grade and the credit value according to the inspection result.

Based on the data protection method provided by this embodiment of the present invention, a credit server receives an identifier of a user from a proxy server, queries a user grade and a credit value of the user according to the identifier, and sends the user grade and the credit value to the proxy server. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 4

Figure 5:
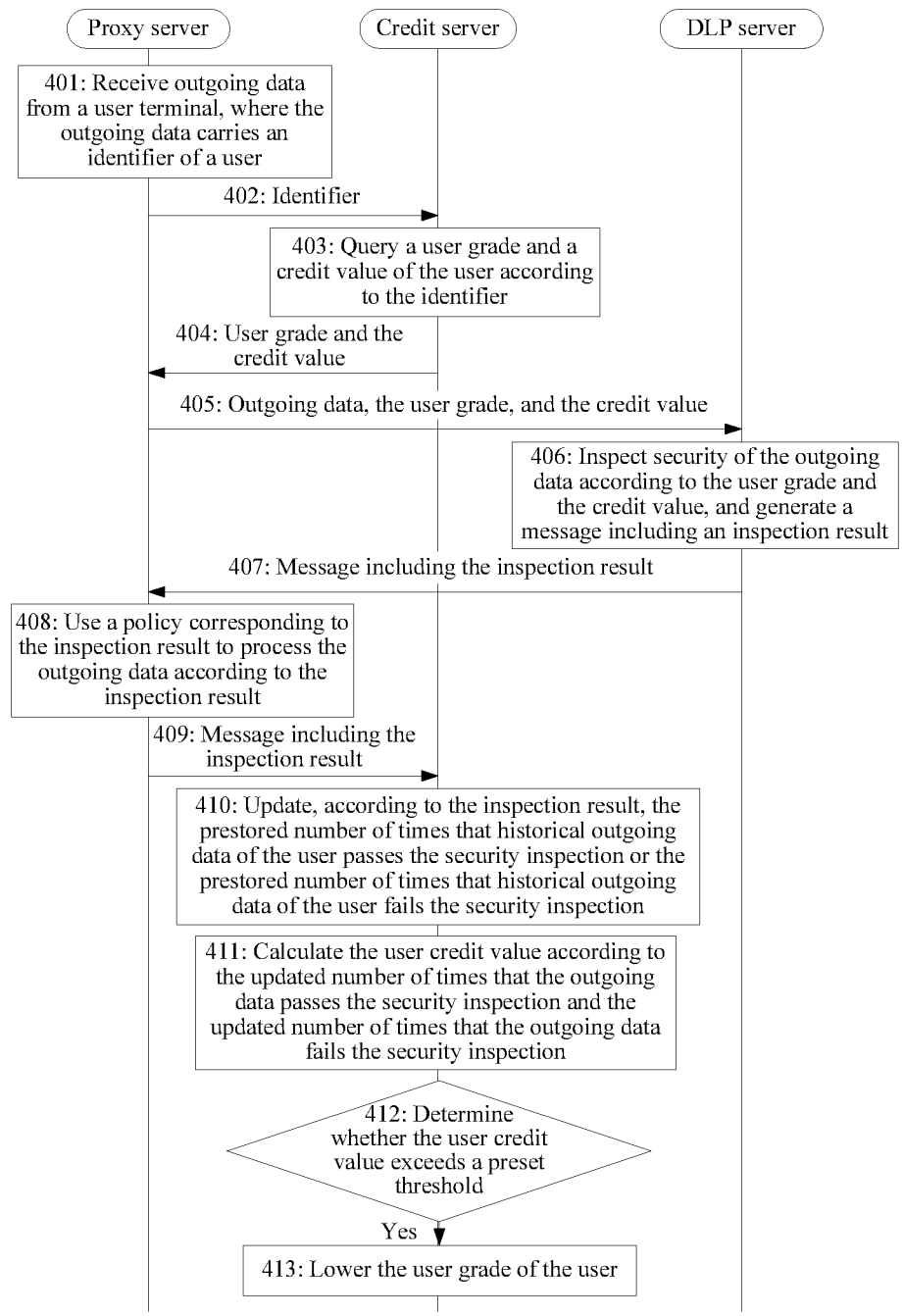
FIG. 5 is a flowchart of a data protection method according to Embodiment 4 of the present invention.

To more clearly describe working processes of a proxy server, a credit server, and a DLP server in a data protection system provided by an embodiment of the present invention, this embodiment of the present invention provides an example of interaction between the forgoing devices by using a sequence diagram. As shown in FIG. 5, the interaction example includes the following steps.

401: The proxy server receives outgoing data from a user terminal, where the outgoing data carries an identifier of a user.

The proxy server receiving outgoing data from a user terminal may include receiving, from the user terminal by the proxy server, the outgoing data that is of the user terminal and passes identity authentication. Before sending the outgoing data to the proxy server, the user terminal may interact with an identity authentication server to complete identity authentication of the user. If the user passes the identity authentication, the user terminal sends the outgoing data to the proxy server. The identity authentication server may be a server having a user identity authentication function, for example, a Remote Authentication Dial In User Service (RADIUS) server.

In an application scenario of this embodiment, the proxy server may be a server that has function characteristics of the identity authentication server and a Web Proxy server, or a server that has function characteristics of the identity authentication server and an MTA server. In this application scenario, after receiving the outgoing data from the user terminal, the proxy server may perform identity authentication on the user sending the outgoing data. If identity authentication succeeds, the proxy server acquires a user grade and a credit value of the user from the credit server according to the identifier.

402: The proxy server sends the identifier to the credit server.

The credit server may determine the user grade according to an administrative grade of the user, a department of the user, a job category of the user, a probability that the user is exposed to internal sensitive data of an enterprise, and a former data security record of the user. For example, the user grade may be classified into an exempted from inspection grade, an inspection grade, and an outgoing permission prohibition grade, where the inspection grade includes a simple inspection grade, a lightweight inspection grade, a heavyweight inspection grade, and a strict inspection grade. For example, a user A is a senior research and development person of a research and development department of a company K, a user B is a common research and development person of the research and development department of the company K, a user C is an employee of a market department of the company K, and a user D is a front desk employee of the company K. Because a research and development person may be exposed to a confidential technology or document inside a company, the credit server may set a user grade of the user A to the outgoing permission prohibition grade or the strict inspection grade and set a user grade of the user B to the strict inspection grade or the heavyweight inspection grade. Because an employee of a market department may contact many customer information of an enterprise, the credit server may set a user grade of the user C to the heavyweight inspection grade or the strict inspection grade and set a user grade of the user D to the simple inspection grade or the exempted from inspection grade.

403: The credit server queries the user grade and the credit value of the user according to the identifier.

For example, the credit server may store a user grade and a credit value of each user within a monitoring scope of a system in a list. Table 1 shows an example of a user grade and credit value table. This table mainly includes two parts of content: an identifier of a user as well as a user grade and a credit value. The identifier may include a user name and a user ID. The user credit value may include the number of times that outgoing data of a user passes the inspection (the number of times passing the inspection), the number of times that historical outgoing data of the user fails the inspection (the number of times that the inspection fails), and a violation percentage of the user, which is calculated according to the number of times passing the inspection and the number of times that the inspection fails.

TABLE 1

User grade and credit value table

| | | User grade and credit value | | | |
|---|---|---|---|---|---|
| | | | | User credit value | |
| Identifier | | | Number of times passing the inspection | Number of times that the inspection fails | Violation percentage |
| User name | ID | User grade | | | |
| Zhao Yi | 1 | strict inspection grade | 5 | 7 | 58.3% |
| Li Qi | 2 | simple inspection grade | 15 | 3 | 16.7% |
| Fan Bo | 3 | exempted from inspection grade | 12 | 0 | 0% |
| . . . | . . . . . . | | . . . | . . . | . . . |
| Sun Wei | n | outgoing permission prohibition grade | 2 | 12 | 85.7% |

404: The credit server sends the user grade and the credit value to the proxy server.

405: The proxy server sends the outgoing data, the user grade, and the credit value to the DLP server.

Exemplarily, when the outgoing data of the user is Web data (for example, an HTTP data flow), the ICAP is used between the proxy server (the Web Proxy server) and the DLP server to transmit HTTP load (namely, the outgoing data). In addition to the outgoing data, data exchanged between the proxy server and the DLP server further includes the identifier of the user, the user grade, and the credit value. Therefore, on a basis that an existing transport protocol is not changed, an extended ICAP header field may be used if transmitted content (an identifier, a user grade, and a credit value) is added. For example, when a user identifier is transmitted, a user-defined ICAP header field X-USER-ID:String may be used; when a user grade is transmitted, a user-defined ICAP header field X-USER-Grade:Value may be used; when a user credit value is transmitted, a user-defined ICAP header field X-USER-Credit:Value may be used. Both the proxy server and the DLP server can identify and support the foregoing user-defined ICAP header fields.

406: The DLP server inspects security of the outgoing data according to the user grade and the credit value, and generates a message including an inspection result.

Figure 6:
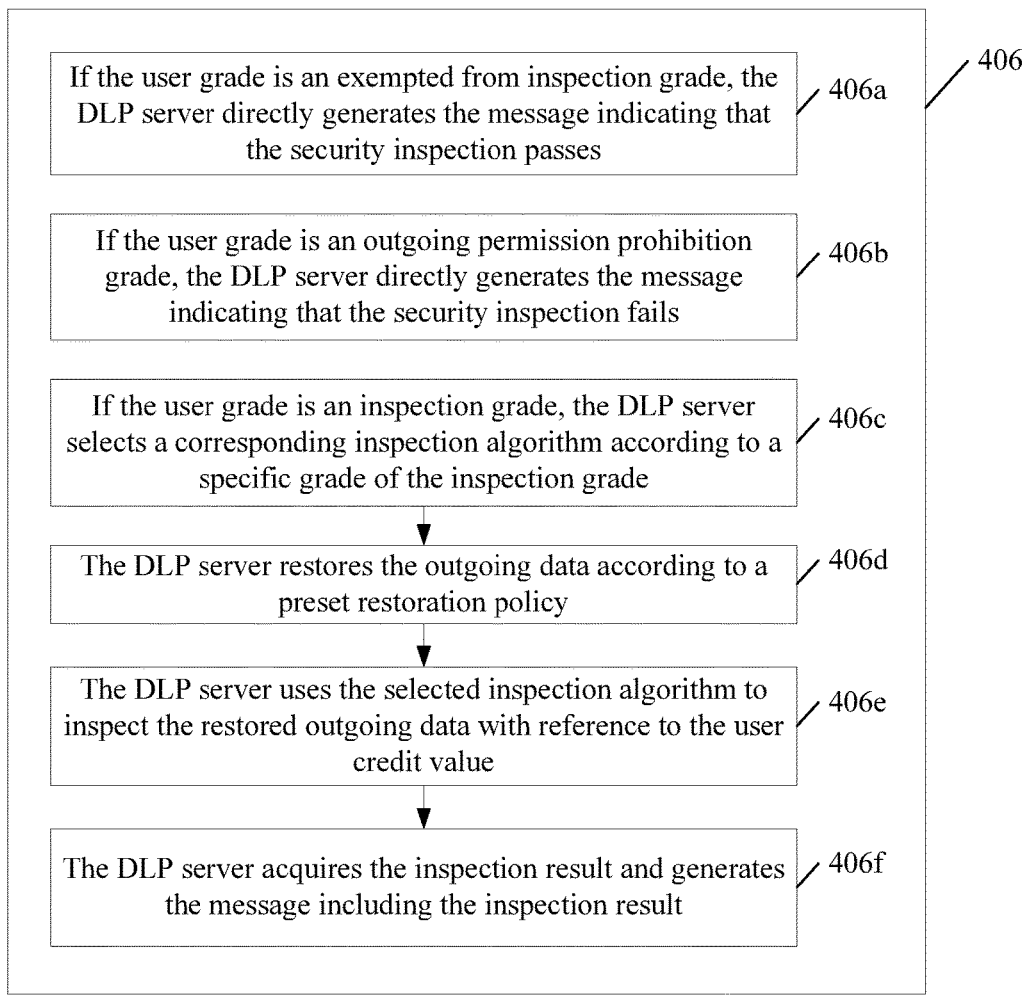
FIG. 6 is a flowchart of another data protection method according to Embodiment 4 of the present invention.

As shown in FIG. 6, step 406 may include one or a combination of the following: step 406a, step 406b, or a small process formed by step 406c to step 406f.

406*a*: If the user grade is the exempted from inspection grade, the DLP server directly generates the message indicating that the security inspection passes.

406*b*: If the user grade is the outgoing permission prohibition grade, the DLP server directly generates the message indicating that the security inspection fails.

406*c*: If the user grade is the inspection grade, the DLP server selects a corresponding inspection algorithm according to a specific grade of the inspection grade.

When the user grade is the inspection grade, the DLP server may first determine the specific grade of the inspection grade, for example, the simple inspection grade, the lightweight inspection grade, the heavyweight inspection grade, and the strict inspection grade, and then select, according to the determined inspection grade, the inspection algorithm corresponding to the inspection grade.

The inspection algorithm may include a keyword matching algorithm, a metadata matching algorithm, a regular expression matching algorithm, a multi-pattern matching algorithm, a fingerprint matching algorithm, and the like. The DLP server may use inspection algorithms with different complexity to inspect outgoing data of users of different grades. For example, when the user grade is the simple inspection grade, the DLP server selects the keyword matching algorithm or the metadata matching algorithm to inspect the outgoing data of the user. When the user grade is the strict inspection grade, the DLP server selects regular expression matching algorithm or multi-pattern matching algorithm to inspect the outgoing data of the user.

Optionally, with respect to different user grades, the DLP server may further use a combination of different algorithms to inspect the outgoing data of the user. For example, when the user grade is the simple inspection grade, the DLP server may select the keyword matching algorithm to inspect the outgoing data of the user; when the user grade is the lightweight inspection grade, the DLP server may select a combined algorithm of the keyword matching algorithm and the metadata matching algorithm to inspect the outgoing data of the user; when the user grade is the heavyweight inspection grade, the DLP server may select a combined algorithm of the keyword matching algorithm, the metadata matching algorithm, and regular expression matching algorithm to inspect the outgoing data of the user; when the user grade is the strict inspection grade, the DLP server may select a combined algorithm of the keyword matching algorithm, the metadata matching algorithm, the regular expression matching algorithm, the multi-pattern matching algorithm, the fingerprint matching algorithm, and the like to inspect the outgoing data of the user. The DLP server using a combined algorithm to inspect the outgoing data of the user may include using, by the DLP server, each algorithm in the combined algorithm to inspect the outgoing data of the user.

406*d*: The DLP server restores the outgoing data according to a preset restoration policy.

For a method of restoring the outgoing data by the DLP server according to the preset restoration policy, reference may be made to a data restoration method used when data is externally sent in the prior art, and details are not described in this embodiment of the present invention again.

In this embodiment of the present invention, step 406*c* may be executed before step 406*d*, step 406*d* may be executed before step 406*c*, or step 406*c* and step 406*d* are executed concurrently. This embodiment of the present invention poses no limitation on an order of executing step 406*c* and step 406*d*.

406*e*: The DLP server uses the selected inspection algorithm to inspect the restored outgoing data with reference to the user credit value.

Exemplarily, the DLP server using the selected inspection algorithm to inspect the restored outgoing data with reference to the user credit value may include using, by the DLP server, the selected inspection algorithm to inspect the restored outgoing data and acquiring an inspection result. The inspection result may be an inspection pass rate of the outgoing data. The DLP server uses a product value of the inspection pass rate of the outgoing data and a difference acquired by subtracting the user credit value (a violation percentage of the user) from 1 as a final inspection result. For example, as shown in Table 1, the user credit value (the violation percentage) of Li Qi is 16.7%. If the inspection pass rate of the outgoing data is 80.5%, where the rate is acquired by the DLP server by using the selected inspection algorithm to inspect the restored outgoing data, a final inspection result of current outgoing data of Li Qi is (1−16.7%)×80.5%=67.1%.

It should be noted that the method used by the DLP server to use the selected inspection algorithm to inspect the restored outgoing data with reference to the user credit value includes but is not limited to the method described above, and other methods used by the DLP server to use the selected inspection algorithm to inspect the restored outgoing data with reference to the user credit value are not described in this embodiment again.

406*f*: The DLP server acquires the inspection result and generates the message including the inspection result.

Exemplarily, the method used by the DLP server to acquire the inspection result and generate the message including the inspection result may include acquiring, by the DLP server, the inspection result; determining, according to the inspection result, whether the outgoing data of the user passes the inspection; generating, if the outgoing data passes the inspection, the message indicating that the security inspection passes; and generating, if the outgoing data fails the inspection, the message indicating that the security inspection fails.

As shown in Table 1, the user credit value (the violation percentage) of Li Qi is 16.7%. If the inspection pass rate of the outgoing data is 80.5%, where the rate is acquired by the DLP server by using the selected inspection algorithm to inspect the restored outgoing data, a final inspection result of current outgoing data of Li Qi is (1−16.7%)×80.5%=67.1%, where the result is acquired by the DLP server. The user credit value (the violation percentage) of Zhao Yi is 58.3%. If the inspection pass rate of the outgoing data is 60.5%, where the rate is acquired by the DLP server by using the selected inspection algorithm to inspect the restored outgoing data, a final inspection result of current outgoing data of Zhao Yi is (1−58.3)×60.5%=25.2%, where the result is acquired by the DLP server.

The DLP server may preset an inspection result threshold, for example, 45%, 25%, and 50%. When a final inspection result of outgoing data of a user is equal to or larger than the threshold, the DLP server may determine that current outgoing data of the user passes the inspection and generates a message indicating that the inspection passes. When a final inspection result of outgoing data of a user is smaller than the threshold, the DLP server may determine that the outgoing data of the user fails the inspection and generates a message indicating that the inspection fails. For example, when the inspection result threshold is 45%, if an inspection pass rate of outgoing data of Li Qi is 60.5%, where 60.5% is larger than 45%, the DLP server may determine that the outgoing data of Li Qi passes the inspection and generates the message indicating that the inspection passes. If an inspection result of outgoing data of Zhao Yi is 25.2%, the DLP server may determine that the outgoing data of Zhao Yi fails the inspection and generates the message indicating that the inspection fails.

Returning to FIG. 5, 407: The DLP server sends the message including the inspection result to the proxy server.

The message including the inspection result may be the message indicating that the inspection passes, which is directly generated by the DLP server when the user grade is the exempted from inspection grade in step 406a, the message indicating that the inspection fails, which is directly generated by the DLP server when the user grade is the outgoing permission prohibition grade in step 406b, or the message indicating that the inspection passes or the message indicating that the inspection fails, which is generated by the DLP server according to the inspection result when the user grade is the inspection grade in steps 406c to 406f.

408: The proxy server uses a policy corresponding to the inspection result to process the outgoing data according to the inspection result.

Figure 7:
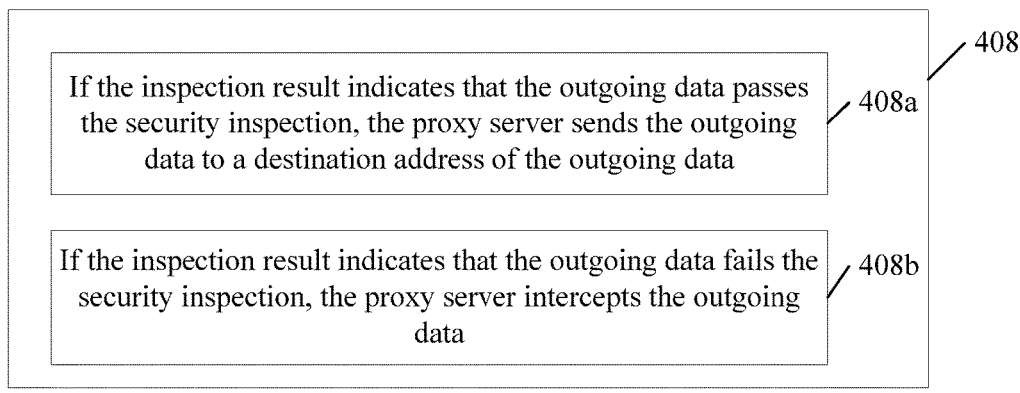
FIG. 7 is a flowchart of another data protection method according to Embodiment 4 of the present invention.

As shown in FIG. 7, step 408 may include step 408a and step 408b.

408a: If the inspection result indicates that the outgoing data passes the security inspection, the proxy server sends the outgoing data to a destination address of the outgoing data.

408b: If the inspection result indicates that the outgoing data fails the security inspection, the proxy server intercepts the outgoing data.

Further optionally, the method in this embodiment may further include sending selectively, by the proxy server, outgoing data to the destination address of the outgoing data when the inspection result indicates that the outgoing data fails the inspection. When the inspection result indicates that the outgoing data fails the inspection, the proxy server may acquire, from the DLP server, a part of data that passes the inspection in the outgoing data and send the part of data to the destination address of the outgoing data.

Further optionally, to ensure real-time performance of the user grade and the user credit value that are stored in the credit server, the method in this embodiment may further include step 409 to step 413.

409: The proxy server sends the message including the inspection result to the credit server.

Further optionally, in an application scenario of this embodiment, step 409 may be replaced by that the DLP server sends the message including the inspection result to the credit server.

410: The credit server updates, according to the inspection result, the prestored number of times that historical outgoing data of the user passes the security inspection or the prestored number of times that historical outgoing data of the user fails the security inspection.

When the message including the inspection result is the message indicating that the inspection passes, the credit server may add 1 to the prestored number of times that historical outgoing data of the user passes the security inspection, and stores an acquired value; when the message including the inspection result is the message indicating that the security inspection fails, the credit server may add 1 to the prestored number of times that historical outgoing data of the user fails the security inspection, and stores an acquired value.

411: The credit server calculates the user credit value according to the updated number of times that the outgoing data passes the security inspection and the updated number of times that the outgoing data fails the security inspection.

The user credit value of the user is the violation percentage of the user, which is calculated by the credit server according to the number of times that historical outgoing data of the user passes the security inspection, and the number of times that historical outgoing data of the user fails the security inspection, where the numbers are prestored in the credit server. When the number of times that historical outgoing data of the user passes the security inspection or the number of times that historical outgoing data of the user fails the security inspection changes, the credit server may re-calculate the user credit value (the violation percentage of the user) according to a changed number of times that historical outgoing data of the user passes the security inspection or a changed number of times that historical outgoing data of the user fails the security inspection.

For example, if the number of times that outgoing data of a user A passes the inspection is x, and the number of times that historical outgoing data of the user A fails the inspection is y, where the numbers are prestored in the credit server, a credit value of the user A, that is, a violation percentage of the user, may be $y/(x+y)$. When the outgoing data of the user A passes the security inspection, the number of times that historical outgoing data of the user A passes the security inspection is $x+1$ and the number of times that historical outgoing data of the user A fails the security inspection is y. In this case, the credit value of the user, that is, the violation percentage of the user, may be $y/(x+1+y)$. When the outgoing data of the user A fails the security inspection, the number of times that historical outgoing data of the user A passes the security inspection is x and the number of times that historical outgoing data of the user A fails the security inspection is $y+1$. In this case, the credit value of the user, that is, the violation percentage of the user, may be $(y+1)/(x+y+1)$.

As an example for step 411, the outgoing data of Li Qi passes the security inspection, and the outgoing data of Zhao Yi fails the security inspection. In this case, the credit server may update data in Table 1. An updated user grade and credit value table is shown in Table 2.

TABLE 2

User grade and credit value table

| | | | User grade and credit value | | |
|---|---|---|---|---|---|
| | | | | User credit value | |
| Identifier | | | Number of times passing the inspection | Number of times that the inspection fails | Violation percentage |
| User name | ID | User grade | | | |
| Zhao Yi | 1 | strict inspection grade | 5 | 8 | 58.3% |
| Li Qi | 2 | simple inspection grade | 16 | 3 | 16.7% |
| ... | ...... | | ... | ... | ... |
| Sun Wei | n | outgoing permission prohibition grade | 2 | 12 | 85.7% |

In Table 2, the number of times that historical outgoing data of Li Qi passes the security inspection increases from 15 to 16; the number of times that historical outgoing data of Zhao Yi fails the security inspection increases from 7 to 8; the violation percentage of Li Qi decreases from 16.7% to 15.8%; the violation percentage of Zhao Yi increases from 58.3% to 61.5%. The foregoing example shows that a violation percentage of a user decreases when the number of times that outgoing data of the user passes the security inspection increases and increases when the number of times that the outgoing data of the user fails the security inspection increases.

412: The credit server determines whether the user credit value exceeds a preset threshold.

413: If the user credit value exceeds the preset threshold, the credit server lowers the user grade of the user.

The credit server may preset the threshold. After calculating the user credit value (the violation percentage), the credit server may determine whether the violation percentage of the user exceeds the threshold. When the user credit value exceeds the preset threshold, the credit server may lower the user grade of the user. For example, if the preset threshold is 60%, the violation percentage of Zhao Yi in the foregoing example increases from 58.3% to 61.5%, where 61.5% exceeds 60%, the credit server may lower the user grade of Zhao Yi from the strict inspection grade to the outgoing permission prohibition grade or another stricter inspection grade.

The method in this embodiment may further include, when the DLP server finds that the outgoing data of the user includes data information seriously violating an inspection policy during the inspection performed by the DLP server on the outgoing data of the user according to the user grade and the credit value, sending, by the DLP server, an outgoing permission prohibition message to the credit server so that the credit server directly lowers the user grade of the user to the outgoing permission prohibition grade.

Based on the data protection method provided by this embodiment of the present invention, a proxy server receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 5

Figure 8:
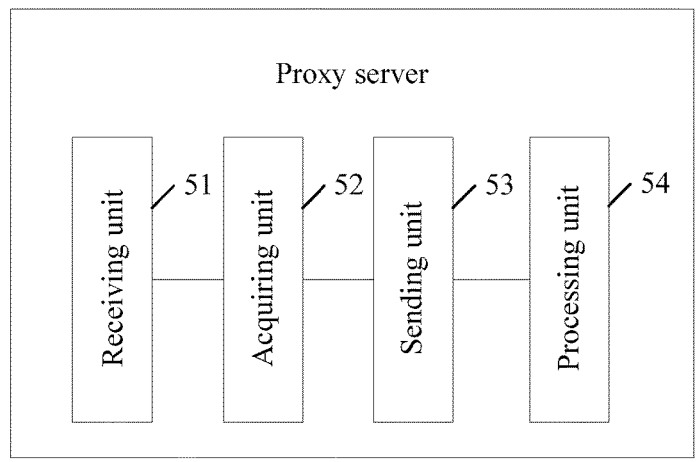
FIG. 8 is a schematic composition diagram of a proxy server according to Embodiment 5 of the present invention.

This embodiment of the present invention provides a proxy server. As shown in FIG. 8, the proxy server includes a receiving unit 51, an acquiring unit 52, a sending unit 53, and a processing unit 54.

The receiving unit 51 is configured to receive outgoing data from a user terminal, where the outgoing data carries an identifier of a user.

The acquiring unit 52 is configured to acquire a user grade and a credit value of the user from a credit server according to the identifier received by the receiving unit 51, where the credit value is a violation percentage of historical outgoing data of the user.

The sending unit 53 is configured to send the outgoing data received by the receiving unit 51 as well as the user grade and the credit value that are acquired by the acquiring unit 52 to a DLP server so that the DLP server inspects security of the outgoing data according to the user grade and the credit value, and further generates a message including an inspection result, where the inspection result includes Pass the security inspection and Fail the security inspection. The sending unit 53 is configured to, if the outgoing data is Web data, send the outgoing data, the user grade, and the credit value to the DLP server using ICAP, where the user grade and the credit value are carried in an extended ICAP header field.

The receiving unit 51 is further configured to receive, from the DLP server, the message including the inspection result.

The processing unit 54 is configured to use a policy corresponding to the inspection result to process the outgoing data according to the inspection result received by the receiving unit 51.

Figure 9:
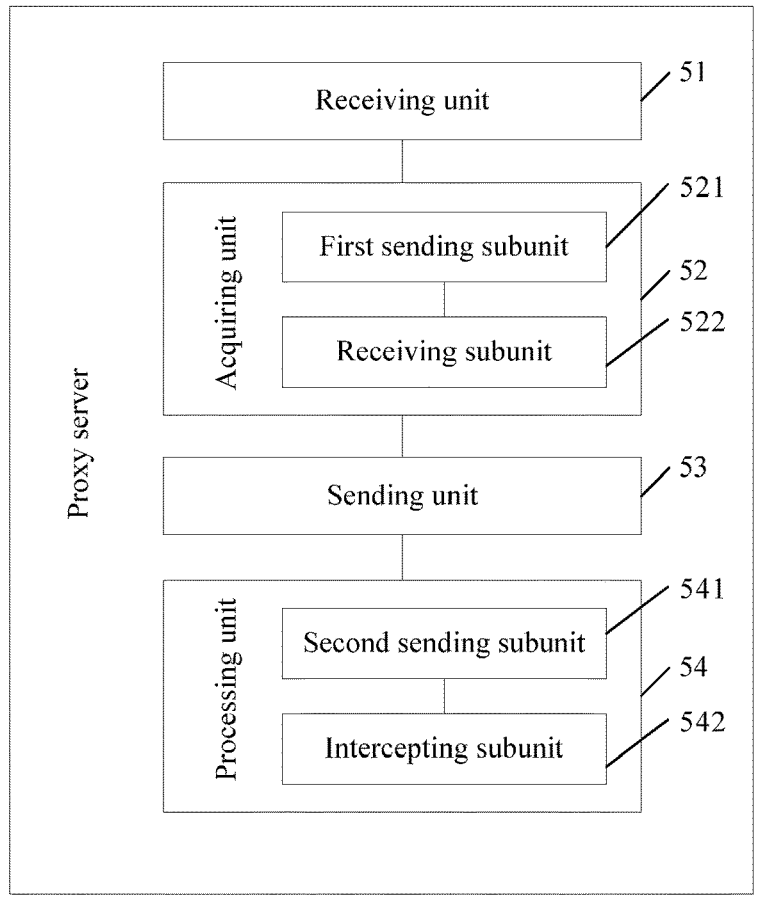
FIG. 9 is a schematic composition diagram of another proxy server according to Embodiment 5 of the present invention.

Further, as shown in FIG. 9, the acquiring unit 52 includes a first sending subunit 521 and a receiving subunit 522.

The first sending subunit 521 is configured to send the identifier to the credit server so that the credit server queries the user grade and the credit value of the user according to the identifier.

The receiving subunit 522 is configured to receive the user grade and the credit value from the credit server.

Further, the outgoing data from the user terminal is outgoing data that is of the user terminal and passes identity authentication.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes the security inspection, and the number of times that historical outgoing data of the user fails the security inspection, where the numbers are prestored in the credit server.

Further, the processing unit 54 includes a second sending subunit 541 and an intercepting subunit 542.

The second sending subunit 541 is configured to, if the inspection result received by the receiving unit 51 indicates that the outgoing data passes the security inspection, send the outgoing data to a destination address of the outgoing data.

The intercepting subunit 542 is configured to, if the inspection result received by the receiving unit 51 indicates that the outgoing data fails the security inspection, intercept the outgoing data.

Further, the sending unit 53 of the proxy server is further configured to, after the processing unit 54 executes the using a policy corresponding to the inspection result to process the outgoing data according to the inspection result, send the message including the inspection result to the credit server so that the credit server updates the user grade and the credit value according to the identifier and the inspection result.

The proxy server provided by this embodiment of the present invention receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 6

Figure 10:
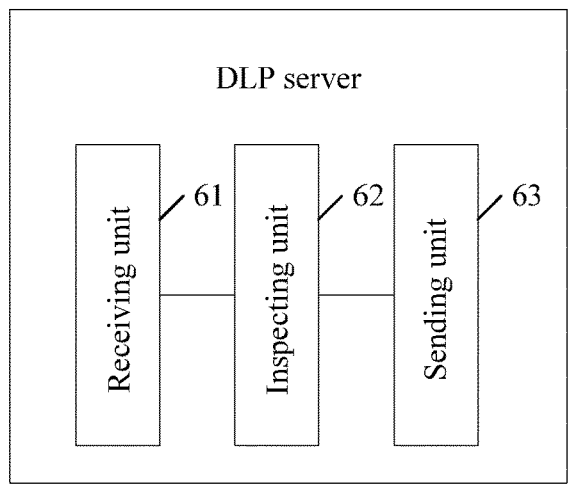
FIG. 10 is a schematic composition diagram of a data loss prevention DLP server according to Embodiment 6 of the present invention.

This embodiment of the present invention provides a DLP server. As shown in FIG. 10, the DLP server includes a receiving unit 61, an inspecting unit 62, and a sending unit 63.

The receiving unit 61 is configured to receive outgoing data, a user grade, and a credit value sent by a proxy server, where the outgoing data carries an identifier of a user, the user grade and the credit value are acquired by the proxy server from a credit server according to the identifier, and the credit value is a violation percentage of historical outgoing data of the user.

The inspecting unit 62 is configured to inspect security of the outgoing data according to the user grade and the credit value that are received by the receiving unit 61, and generate a message including an inspection result, where the inspection result includes Pass the security inspection and Fail the security inspection.

The sending unit 63 is configured to send, to the proxy server, the message including the inspection result, which is generated by the inspecting unit 62 so that the proxy server uses a policy corresponding to the inspection result to process the outgoing data according to the inspection result.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes the security inspection, and the number of times that historical outgoing data of the user fails the security inspection, where the numbers are prestored in the credit server.

Figure 11:
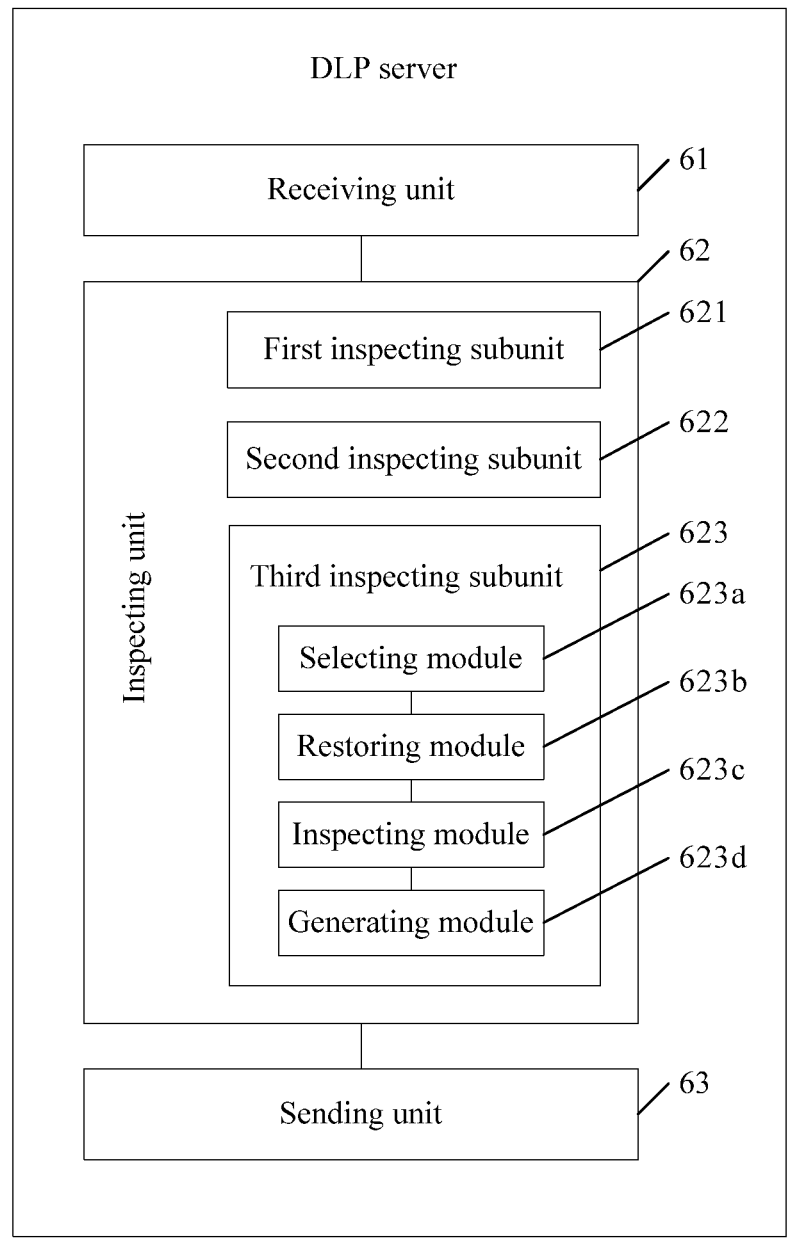
FIG. 11 is a schematic composition diagram of another DLP server according to Embodiment 6 of the present invention.

Further, as shown in FIG. 11, the inspecting unit 62 includes a first inspecting subunit 621, a second inspecting subunit 622, and a third inspecting subunit 623. It should be noted that the first inspecting subunit 621, the second inspecting subunit 622, and the third inspecting subunit 623 may be disposed independently or may be combined randomly.

The first inspecting subunit 621 is configured to, if the user grade is the exempted from inspection grade, directly generate the message indicating that the security inspection passes.

The second inspecting subunit 622 is configured to, if the user grade is the outgoing permission prohibition grade, directly generate the message indicating that the security inspection fails.

The third inspecting subunit 623 is configured to, if the user grade is the inspection grade, inspect the security of the outgoing data according to the inspection grade and the credit value, and generate the message including the inspection result.

Further, the third inspecting subunit 623 includes a selecting module 623a, a restoring module 623b, an inspecting module 623c, and a generating module 623d.

The selecting module 623a is configured to select a corresponding inspection algorithm according to a specific grade of the inspection grade.

The restoring module 623b is configured to restore the outgoing data according to a preset restoration policy.

The inspecting module 623c is configured to use the selected inspection algorithm to inspect the restored outgoing data with reference to the credit value.

The generating module 623d is configured to acquire the inspection result and generate the message including the inspection result.

Further, the sending unit 63 is further configured to, after the message including the inspection result is sent to the proxy server, send the message including the inspection result to the credit server so that the credit server updates the user grade and the credit value according to the identifier and the inspection result.

The DLP server provided by this embodiment of the present invention receives outgoing data, a user grade, and a credit value from a proxy server, where the outgoing data carries an identifier of a user, the user grade and the credit value are acquired by the proxy server from a credit server according to the identifier, and the credit value is a violation percentage of historical outgoing data of the user; then inspects security of the outgoing data according to the user grade and the credit value, and generates a message including an inspection result; and finally sends the message including the inspection result to the proxy server so that the proxy server uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 7

Figure 12:
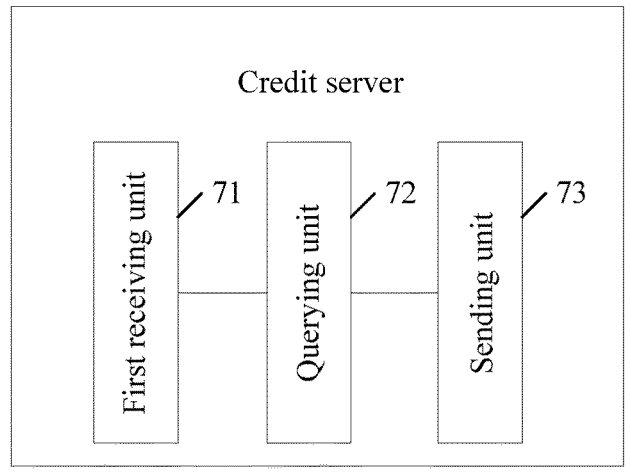
FIG. 12 is a schematic composition diagram of a credit server according to Embodiment 7 of the present invention.

This embodiment of the present invention provides a credit server. As shown in FIG. 12, the credit server includes a first receiving unit 71, a querying unit 72, and a sending unit 73.

The first receiving unit 71 is configured to receive an identifier of a user from a proxy server.

The querying unit 72 is configured to query a user grade and a credit value of the user according to the identifier received by the first receiving unit 71, where the credit value is a violation percentage of outgoing data of the user.

The sending unit 73 is configured to send the user grade and the credit value that are queried by the querying unit 72 to the proxy server.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes security inspection, and the number of times that historical outgoing data of the user fails the security inspection, where the numbers are prestored in the credit server.

Figure 13:
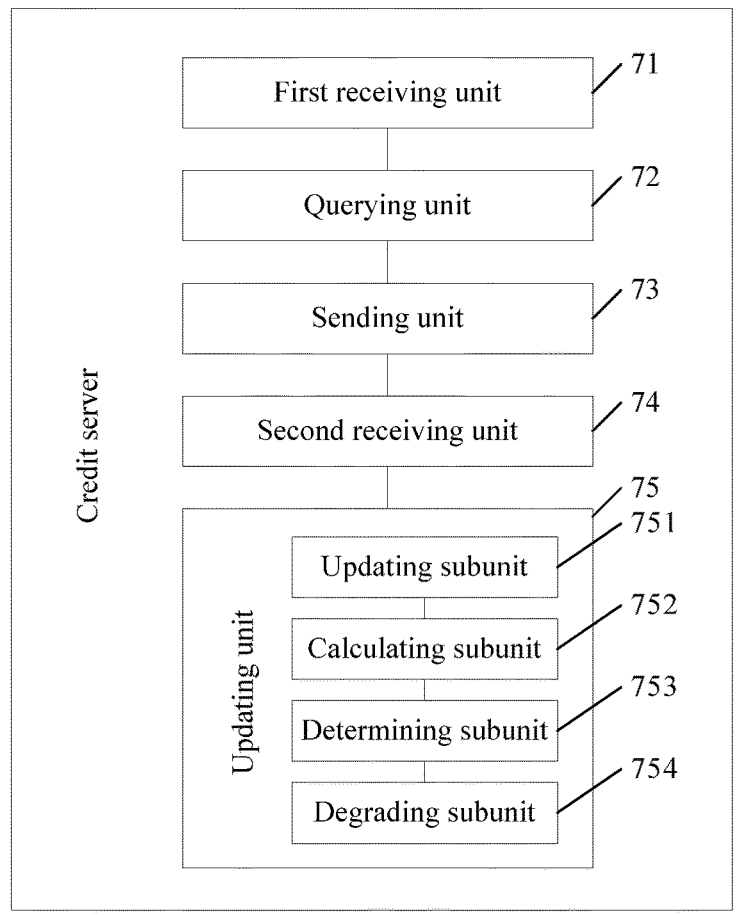
FIG. 13 is a schematic composition diagram of another credit server according to Embodiment 7 of the present invention.

Further, as shown in FIG. 13, the credit server may further include a second receiving unit 74 and an updating unit 75.

The second receiving unit 74 is configured to, after the sending unit 73 sends the user grade and the credit value to the proxy server, receive, from a DLP server, a message including an inspection result; or receive, from the proxy server, a message including an inspection result.

The updating unit 75 is configured to update the user grade and the credit value according to the inspection result received by the second receiving unit 74.

Further, the updating unit 75 includes an updating subunit 751, a calculating subunit 752, a determining subunit 753, and a degrading subunit 754.

The updating subunit 751 is configured to update, according to the inspection result, the prestored number of times that historical outgoing data of the user passes the security inspection or the prestored number of times that historical outgoing data of the user fails the security inspection.

The calculating subunit 752 is configured to calculate the credit value according to the number of times that the outgoing data passes the security inspection, and the number of times that the outgoing data fails the security inspection, where the numbers are updated by the updating subunit 751.

The determining subunit 753 is configured to determine whether the credit value exceeds a preset threshold.

The degrading subunit 754 is configured to, if the determining subunit 753 determines that the credit value exceeds the preset threshold, lower the user grade.

The credit server provided by this embodiment of the present invention receives an identifier of a user from a proxy server, queries a user grade and a credit value of the user according to the identifier, and sends the user grade and the credit value to the proxy server. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 8

Figure 14:
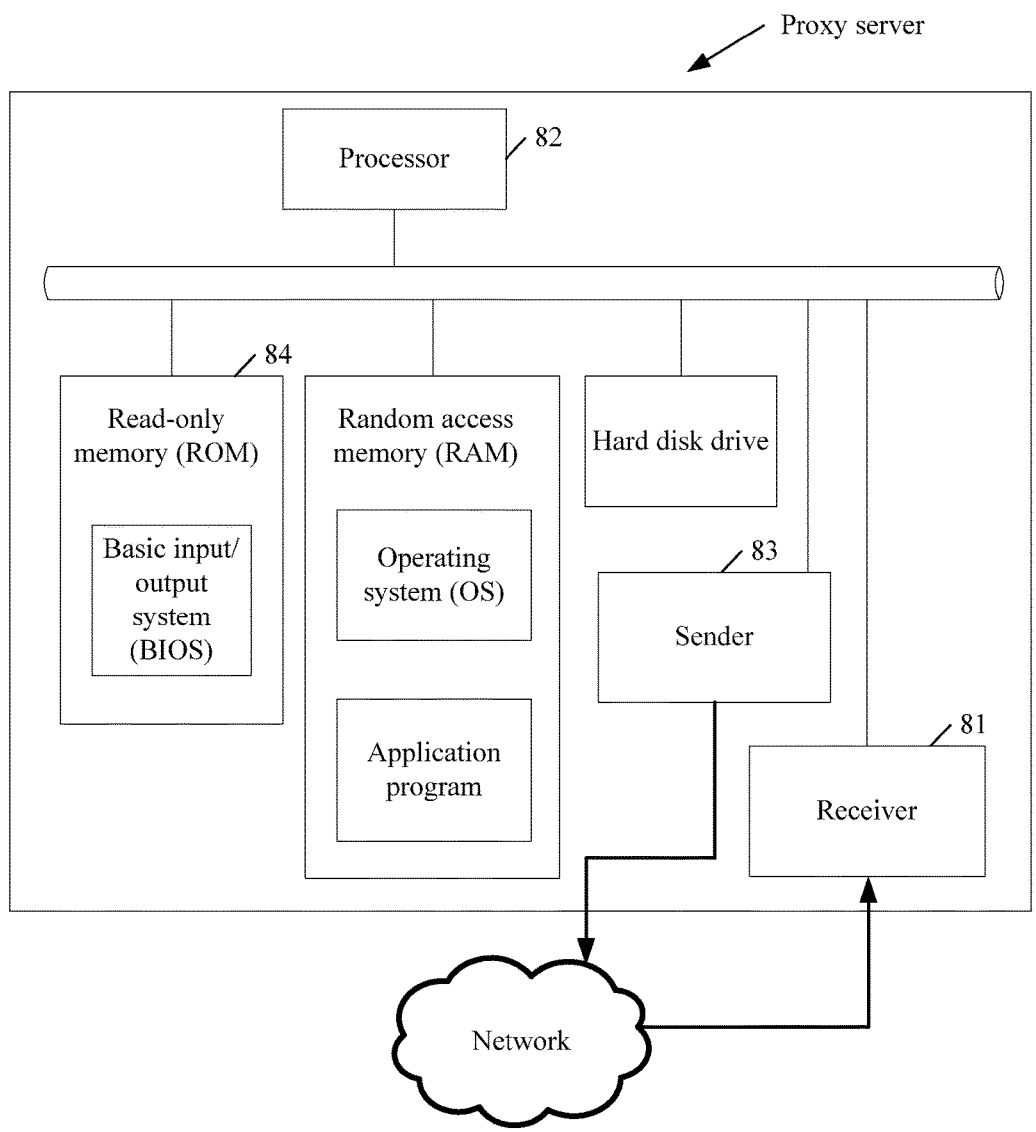
FIG. 14 is a schematic composition diagram of a proxy server according to Embodiment 8 of the present invention.

This embodiment of the present invention provides a proxy server. As shown in FIG. 14, the proxy server includes a receiver 81, a processor 82, a sender 83, and a memory 84.

The receiver 81 is configured to receive outgoing data from a user terminal, where the outgoing data carries an identifier of a user.

The memory 84 is configured to store the outgoing data.

The processor 82 is configured to acquire a user grade and a credit value of the user from a credit server according to the identifier that is received by the receiver 81 and stored in the memory 84, where the credit value is a violation percentage of historical outgoing data of the user.

The sender 83 is configured to send the outgoing data received by the receiver 81 as well as the user grade and the credit value that are acquired by the processor 82 to a data loss prevention DLP server so that the DLP server inspects security of the outgoing data according to the user grade and the credit value, and further generates a message including an inspection result, where the inspection result includes Pass the security inspection and Fail the security inspection.

The receiver 81 is further configured to receive, from the DLP server, the message including the inspection result.

The processor 82 is further configured to use a policy corresponding to the inspection result to process the outgoing data according to the inspection result received by the receiver 81.

Further, the sender 83 is further configured to send the identifier to the credit server so that the credit server queries the user grade and the credit value of the user according to the identifier.

The receiver 81 is further configured to receive the user grade and the credit value from the credit server.

Further, the outgoing data from the user terminal is outgoing data that is of the user terminal and passes identity authentication.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes the security inspection, and the number of times that historical outgoing data of the user fails the security inspection, where the numbers are prestored in the credit server.

Further, the sender 83 is further configured to, if the inspection result received by the receiver 81 indicates that the outgoing data passes the security inspection, send the outgoing data to a destination address of the outgoing data.

Further, the processor 82 is further configured to, if the inspection result received by the receiver 81 indicates that the outgoing data fails the security inspection, intercept the outgoing data.

Further, the sender 83 is further configured to, after the processor 82 executes the using a policy corresponding to the inspection result to process the outgoing data according to the inspection result, send the message including the inspection result to the credit server so that the credit server updates the user grade and the credit value according to the identifier and the inspection result.

The proxy server provided by this embodiment of the present invention receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 9

Figure 15:
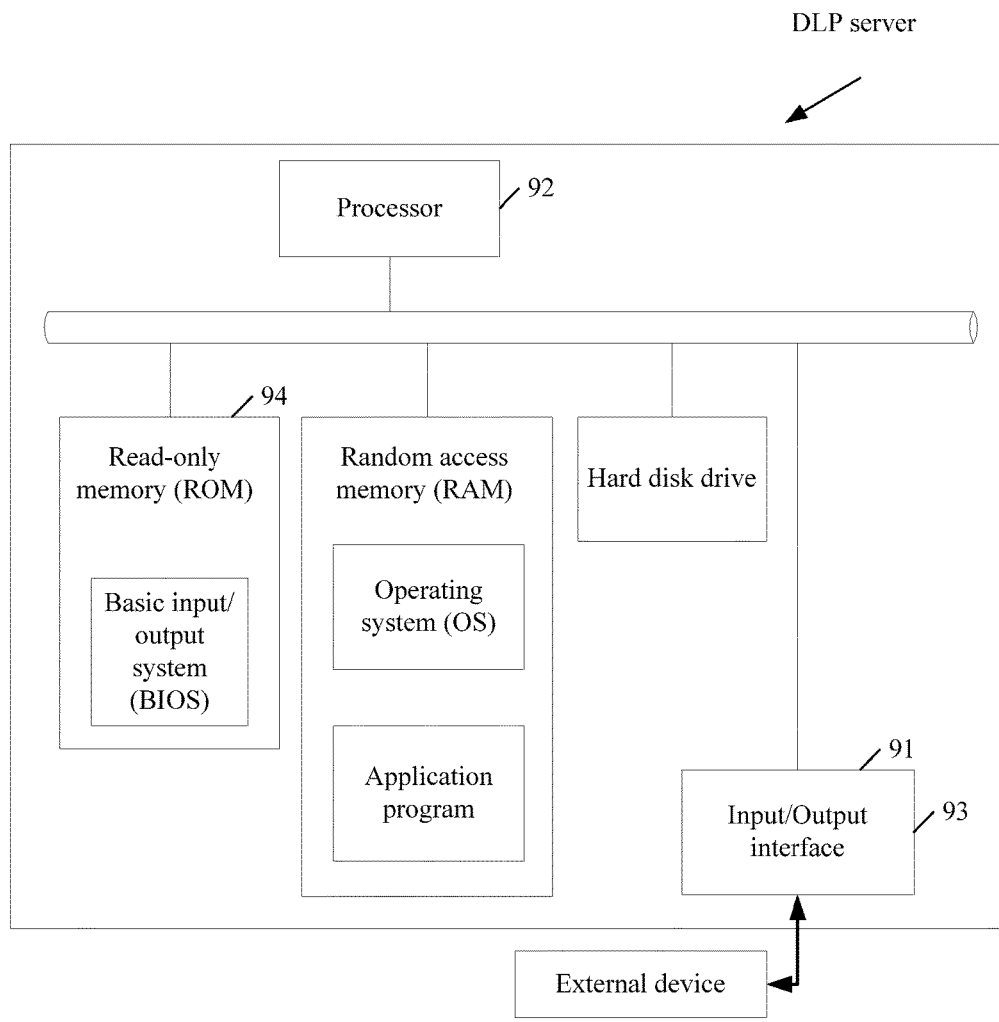
FIG. 15 is a schematic composition diagram of a DLP server according to Embodiment 9 of the present invention.

This embodiment of the present invention provides a DLP server. As shown in FIG. 15, the DLP server at least includes a receiver 91, a processor 92, a sender 93, and a memory 94. The receiver 91 and the sender 93 may be referred to collectively as an input/output interface.

The memory 94 is configured to store program code.

The receiver 91 is configured to receive outgoing data, a user grade, and a credit value sent by a proxy server, where the outgoing data carries an identifier of a user, the user grade and the credit value are acquired by the proxy server from a credit server according to the identifier, and the credit value is a violation percentage of historical outgoing data of the user.

The processor 92 is configured to read the program code stored in the memory 94, inspect security of the outgoing data according to the user grade and the credit value that are received by the receiver 91, and generate a message including an inspection result, where the inspection result includes Pass the security inspection and Fail the security inspection.

The sender 93 is configured to send, to the proxy server, the message including the inspection result, which is generated by the processor 92 so that the proxy server uses a policy corresponding to the inspection result to process the outgoing data according to the inspection result.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes the security inspection, and the number of times that historical outgoing data of the user fails the security inspection, where the numbers are prestored in the credit server.

Further, the processor 92 is further configured to, if the user grade is the exempted from inspection grade, directly generate the message indicating that the security inspection passes; if the user grade is the outgoing permission prohibition grade, directly generate the message indicating that the security inspection fails; and if the user grade is the inspection grade, inspect the security of the outgoing data according to the inspection grade and the credit value, and generate the message including the inspection result.

Further, the processor 92 is further configured to, if the user grade is the inspection grade, select a corresponding inspection algorithm according to a specific grade of the inspection grade; restore the outgoing data according to a preset restoration policy; use the selected inspection algorithm to inspect the restored outgoing data with reference to the credit value; and acquire the inspection result and generate the message including the inspection result.

Further, the sender 93 is further configured to, after the message including the inspection result is sent to the proxy server, send the message including the inspection result to the credit server so that the credit server updates the user grade and the credit value according to the identifier and the inspection result.

The DLP server provided by this embodiment of the present invention receives outgoing data, a user grade, and a credit value from a proxy server, where the outgoing data carries an identifier of a user, the user grade and the credit value are acquired by the proxy server from a credit server according to the identifier, and the credit value is a violation percentage of historical outgoing data of the user; then inspects security of the outgoing data according to the user grade and the credit value, and generates a message including an inspection result; and finally sends the message including the inspection result to the proxy server so that the proxy server uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 10

Figure 16:
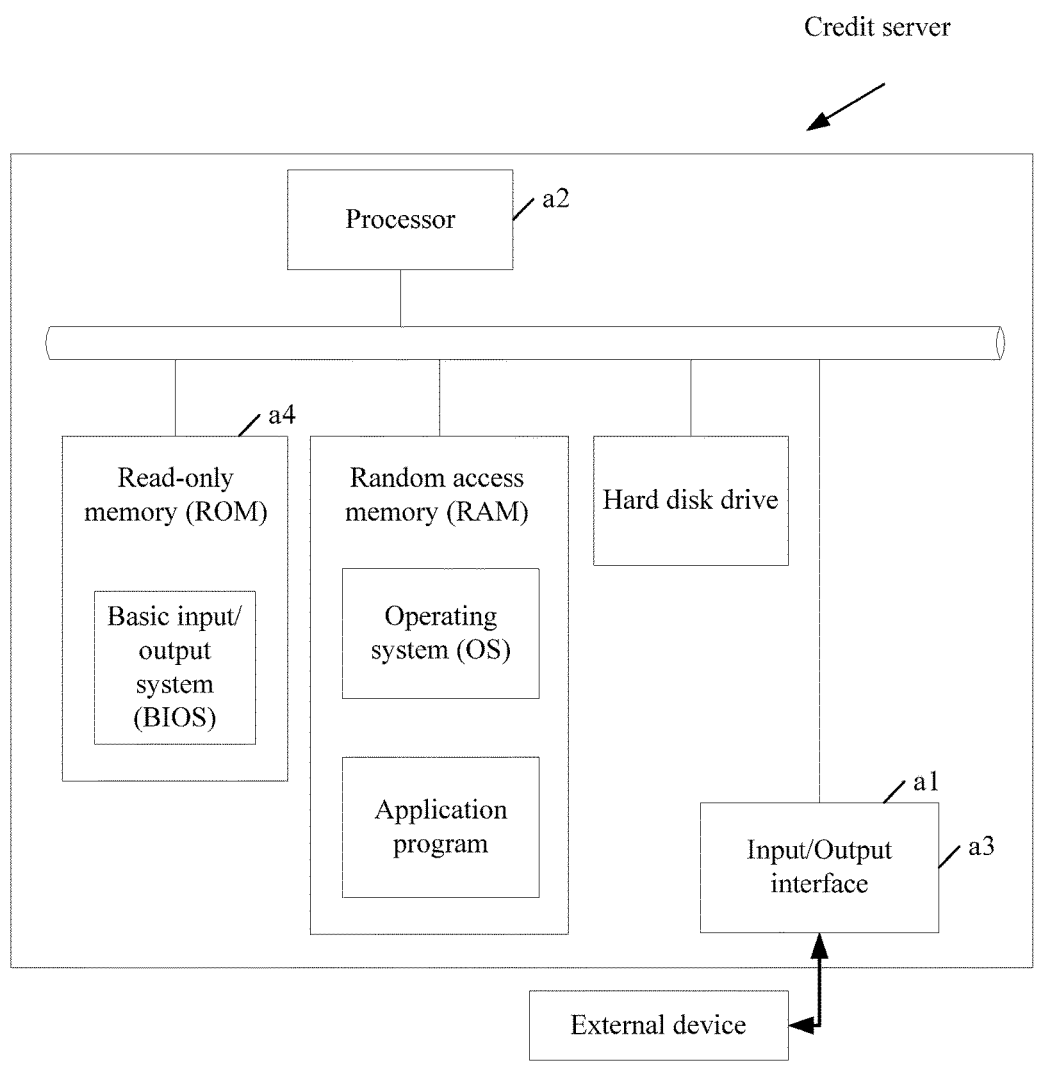
FIG. 16 is a schematic composition diagram of a credit server according to Embodiment 10 of the present invention.

This embodiment of the present invention provides a credit server. As shown in FIG. 16, the credit server includes a receiver a1, a processor a2, a sender a3, and a memory a4. The receiver a1 and the sender a3 may be referred to collectively as an input/output interface.

The receiver a1 is configured to receive an identifier of a user from a proxy server.

The processor a2 is configured to query a user grade and a credit value of the user according to the identifier received by the receiver a1, where the credit value is a violation percentage of outgoing data of the user.

The sender a3 is configured to send the user grade and the credit value that are queried by the processor a2 to the proxy server.

The memory a4 is configured to store the user grade and the credit value of the user.

Further, the user grade of the user includes an exempted from inspection grade, an inspection grade, and an outgoing permission prohibition grade, where the inspection grade at least includes a simple inspection grade and a strict inspection grade.

The violation percentage is calculated by the credit server according to the number of times that historical outgoing data of the user passes security inspection, and the number of times that historical outgoing data of the user fails the security inspection, where the numbers are prestored in the credit server.

Further, the receiver a1 is further configured to, after the sender a3 sends the user grade and the credit value to the proxy server, receive, from a DLP server, a message including an inspection result; or receive, from the proxy server, a message including an inspection result.

The processor a2 further updates the user grade and the credit value according to the inspection result received by the receiver a1.

Further, the processor a3 is further configured to update, according to the inspection result, the prestored number of times that historical outgoing data of the user passes the security inspection or the prestored number of times that historical outgoing data of the user fails the security inspection; calculate the credit value according to the updated number of times that the outgoing data passes the security inspection and the updated number of times that the outgoing data fails the security inspection; determine whether the credit value exceeds a preset threshold; and if it is determined that the credit value exceeds the preset threshold, lower the user grade.

The credit server provided by this embodiment of the present invention receives an identifier of a user from a proxy server, queries a user grade and a credit value of the user according to the identifier, and sends the user grade and the credit value to the proxy server. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Embodiment 11

This embodiment of the present invention provides a data protection system. As shown in FIG. 1, the data protection system includes a proxy server, a DLP server, and a credit server.

The proxy server is configured to receive outgoing data from a user terminal, where the outgoing data carries an identifier of a user; acquire a user grade and a credit value of the user from the credit server according to the identifier, where the credit value is a violation percentage of historical outgoing data of the user; send the outgoing data, the user grade, and the credit value to the DLP server so that the DLP server inspects security of the outgoing data according to the user grade and the credit value, and further generates a message including an inspection result; and receive, from the DLP server, the message including the inspection result and use a policy corresponding to the inspection result to process the outgoing data according to the inspection result.

The DLP server is configured to receive the outgoing data, the user grade, and the credit value sent by the proxy server, where the outgoing data carries the identifier of the user, the user grade and the credit value are acquired by the proxy server from the credit server according to the identifier, and the credit value is the violation percentage of historical outgoing data of the user; inspect the security of the outgoing data according to the user grade and the credit value, and generate the message including the inspection result; and send the message including the inspection result to the proxy server so that the proxy server uses the policy corresponding to the inspection result to process the outgoing data according to the inspection result.

The credit server is configured to receive the identifier of the user from the proxy server; query the user grade and the credit value of the user according to the identifier, where the credit value is the violation percentage of historical outgoing data of the user; and send the user grade and the credit value to the proxy server.

Further, the credit server is further configured to receive, from the DLP server or the proxy server, the message including the inspection result, and update the user grade and the credit value according to the inspection result.

The inspection result is acquired by the DLP server by inspecting the security of the outgoing data according to the user grade and the credit value.

It should be noted that, in the data protection system provided by this embodiment of the present invention, for descriptions of the proxy server, the DLP server, and the credit server, reference may be made to corresponding content in the method embodiments or other apparatus embodiments, and details are not described in this embodiment again.

Based on the method, the apparatus, and the system for data protection according to the embodiments of the present invention, a proxy server receives outgoing data from a user terminal, where the outgoing data carries an identifier of a user; acquires a user grade and a credit value of the user from a credit server according to the identifier, where the credit value is a violation percentage of historical outgoing data of the user; sends the outgoing data, the user grade, and the credit value to a DLP server so that the DLP server inspects security of the outgoing data according to the user grade and the credit value, and further generates a message including an inspection result; and receives, from the DLP server, the message including the inspection result and uses a policy corresponding to the inspection result to process the outgoing data according to the inspection result. Compared with that a same inspection process is executed for outgoing data of all users within a monitoring scope of a system during security inspection in the prior art, different inspection algorithms may be selected for different users according to user grades and credit values to inspect security of outgoing data, which may reduce a security inspection delay of the outgoing data and further improve efficiency of external sending of data and user experience.

Based on the foregoing descriptions of the embodiments, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

A person of ordinary skill in the art may understand that the aspects of the present invention or the possible implementation manners of the aspects may be implemented as a system, a method, or a computer program product. Therefore, the aspects of the present invention or the possible implementation manners of the aspects may adopt a form of hardware only embodiments, software only embodiments (including firmware, resident software, and the like), or embodiments in combination of software and hardware, which is herein collectively called a "circuit", a "module", or a "system". In addition, the aspects of the present invention or the possible implementation manners of the aspects may adopt a form of a computer program product that refers to computer readable program code stored in a computer readable medium.

The computer readable medium may be a computer readable signal medium or a computer readable storage medium. The computer readable storage medium includes but is not limited to an electronic, magnetic, optical, electromagnetic, infrared or semi-conductor system, device, or apparatus, or any proper combination of the foregoing, for example, a random access memory (RAM), a read-only memory (ROM), an erasable programmable read-only memory (EPROM or a flash memory), an optical fiber, and a compact disc read-only memory (CD-ROM).

A processor in a computer reads the computer readable program code stored in the computer readable medium so that the processor can execute functions and actions specified in each step or a combination of the steps in a flowchart and generates apparatuses that implement functions and actions specified in each block or a combination of the blocks in a block diagram.

The computer readable program code may be completely executed on a computer of a user, may be partially executed on a computer of a user, may be implemented as an independent software package, may be partially implemented on a computer of a user and partially implemented on a remote computer, or may be completely executed on a remote computer or a server. It should also be noted that, in some alternative implementation solutions, steps in a flowchart or functions indicated by blocks in a block diagram may not be implemented in an order indicated in the flowchart or block diagram. For example, two steps or blocks that depend on an involved function and are shown in sequence may be actually executed concurrently, or sometimes these blocks may be executed in a reverse order.

It is apparent that a person skilled in the art can make various modifications and variations to the present invention without departing from the spirit and scope of the present invention. The present invention is intended to cover these modifications and variations provided that they fall within the scope of protection defined by the following claims or their equivalent technologies.

What is claimed is:

1. A data loss prevention (DLP) server deployed in a local area network of an enterprise, the DLP server comprising:
a receiver configured to receive outgoing data, a user grade, and a credit value from a proxy server deployed at a border between the local area network and an external network, wherein the outgoing data is sent by a user in the enterprise to the external network and carries an identifier of the user, wherein the user grade is determined based on an administrative grade of the user, a department of the user, a job category of the user, or a probability that the user is exposed to internal sensitive data of the enterprise, wherein the user grade comprises one or more of: an exempted from inspection grade, an inspection grade corresponding to an inspection algorithm for inspecting the outgoing data, or an outgoing permission prohibition grade, and wherein the credit value is a violation percentage of historical outgoing data of the user calculated based on a number of times that historical outgoing data of the user passes a security inspection and a number of times that historical outgoing data of the user fails the security inspection;

a processor coupled to the receiver;

a memory coupled to the processor and configured to store instructions that when executed by the processor cause the DLP server to:

inspect security of the outgoing data based on the user grade and the credit value, wherein inspecting security of the outgoing data when the user grade comprises the inspection grade comprises:

selecting the inspection algorithm based on a specific grade of the inspection grade;

restoring the outgoing data based on a preset restoration policy; and using the inspection algorithm to inspect restored outgoing data with reference to the credit value; and generate a message comprising an inspection result, wherein the inspection result comprises either a pass or a fail; and a transmitter configured to send, to the proxy server, the message comprising the inspection result.

2. The DLP server of claim 1, wherein when the user grade comprises the inspection grade, the inspection grade further comprises a simple inspection grade or a strict inspection grade.

3. The DLP server of claim 2, wherein the number of times that historical outgoing data of the user passes the security inspection and the number of times that historical outgoing data of the user fails the security inspection are stored in a credit server, and wherein the transmitter is further configured to send the message comprising the inspection result to the credit server after the message comprising the inspection result is sent to the proxy server.

4. The DLP server of claim 1, wherein the instructions further cause the DLP server to:

skip inspection of the security of the outgoing data and generate a message indicating that the security inspection passes when the user grade is the exempted from inspection grade; and skip inspection of the security of the outgoing data and generate a message indicating that the security inspection fails when the user grade is the outgoing permission prohibition grade.

5. The DLP server of claim 4, wherein the number of times that historical outgoing data of the user passes the security inspection and the number of times that historical outgoing data of the user fails the security inspection are stored in a credit server, and wherein the transmitter is further configured to send the message comprising the inspection result to the credit server after the message comprising the inspection result is sent to the proxy server.

6. The DLP server of claim 1, wherein the number of times that historical outgoing data of the user passes the security inspection and the number of times that historical outgoing data of the user fails the security inspection are stored in a credit server, and wherein the transmitter is further configured to send the message comprising the inspection result to the credit server after the message comprising the inspection result is sent to the proxy server.

7. The DUD server of claim 1, wherein the number of times that historical outgoing data of the user passes the security inspection and the number of times that historical outgoing data of the user fails the security inspection are stored in a credit server, and wherein the transmitter is further configured to send the message comprising the inspection result to the credit server after the message comprising the inspection result is sent to the proxy server.

8. The DLP server of claim 1, wherein the outgoing data, the user grade, and the credit value is sent from the proxy server using Internet Content Adaptation Protocol (ICAP) when the outgoing data is Web data, and wherein the user grade and the credit value are carried in an extended ICAP header field.

9. A data protection method implemented by a data loss prevention (DLP) server deployed in a local area network of an enterprise, the method comprising:

receiving outgoing data, a user grade, and a credit value from a proxy server that deployed at a border between the local area network and an external network, wherein the outgoing data is sent by a user in the enterprise to the external network and carries an identifier of the user, wherein the user grade is determined based on an administrative grade of the user, a department of the user, a job category of the user, or a probability that the user is exposed to internal sensitive data of the enterprise, wherein the user grade comprises one or more of:

an exempted from inspection grade, an inspection grade corresponding to an inspection algorithm for inspecting the outgoing data, or an outgoing permission prohibition grade, and wherein the credit value is a violation percentage of historical outgoing data of the user calculated based on a number of times that historical outgoing data of the user passes the security inspection and a number of times that historical outgoing data of the user fails the security inspection;

inspecting security of the outgoing data based on the user grade and the credit value, wherein inspecting the security of the outgoing data when the user grade comprises the inspection grade comprises:

selecting the inspection algorithm based on a specific grade of the inspection grade;

restoring the outgoing data based on a preset restoration policy; and using the inspection algorithm to inspect restored outgoing data with reference to the credit value;

generating a message comprising an inspection result, wherein the inspection result comprises either a pass or a fail; and sending, to the proxy server, the message comprising the inspection result.

10. The method of claim 9, wherein the inspection grade comprises a simple inspection grade or a strict inspection grade.

11. The method of claim 9, wherein inspecting the security of the outgoing data comprises:

skipping inspecting the security of the outgoing data and generating a message indicating that the security inspection passes when the user grade is the exempted from inspection grade; and skipping inspecting the security of the outgoing data and generating a message indicating that the security inspection fails when the user grade is an outgoing permission prohibition grade.

12. The method of claim 9, wherein the number of times that historical outgoing data of the user passes the security inspection and the number of times that historical outgoing data of the user fails the security inspection are stored in a credit server, and wherein the method further comprises sending the message comprising the inspection result to the credit server after the message comprising the inspection result is sent to the proxy server.

13. The method of claim 9, wherein the outgoing data, the user grade, and the credit value is sent from the proxy server using Internet Content Adaptation Protocol (ICAP) when the outgoing data is Web data, and wherein the user grade and the credit value are carried in an extended ICRP header field.

* * * * *

UNITED STATES PATENT AND TRADEMARK OFFICE
CERTIFICATE OF CORRECTION

| | | |
|---|---|---|
| PATENT NO. | : 9,984,241 B2 | Page 1 of 1 |
| APPLICATION NO. | : 14/835822 | |
| DATED | : May 29, 2018 | |
| INVENTOR(S) | : Wei Jin | |

It is certified that error appears in the above-identified patent and that said Letters Patent is hereby corrected as shown below:

Column 30; Line 9; Claim 7 should read:
The DLP server of claim 1, wherein the number of Column 31; Line 16; Claim 13 should read:
the credit value are carried in an extended ICAP header field.

Signed and Sealed this
Seventeenth Day of July, 2018

Andrei Iancu
*Director of the United States Patent and Trademark Office*